United States Patent
Ishimaru

(10) Patent No.: US 7,965,401 B2
(45) Date of Patent: Jun. 21, 2011

(54) IMAGE-FORMING APPARATUS TO FORM AN IMAGE BASED ON PRINT DATA, PRINT-JOB CONTROL METHOD, AND PRINT-JOB CONTROL PROGRAM EMBODIED IN COMPUTER READABLE MEDIUM

(75) Inventor: Kohji Ishimaru, Sakai (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 1233 days.

(21) Appl. No.: 11/607,931

(22) Filed: Dec. 4, 2006

(65) Prior Publication Data

US 2008/0007767 A1    Jan. 10, 2008

(30) Foreign Application Priority Data

Jul. 10, 2006   (JP) ................................ 2006-188860

(51) Int. Cl.
*G06K 15/00* (2006.01)
*G06F 3/12* (2006.01)
*G03G 21/04* (2006.01)

(52) U.S. Cl. ........... 358/1.14; 358/1.15; 399/8; 399/366

(58) Field of Classification Search .................. 358/1.14, 358/1.15, 1.16; 399/8, 9, 16, 366
See application file for complete search history.

(56) References Cited

U.S. PATENT DOCUMENTS

| 6,980,319 B2 * | 12/2005 | Ohta ............................ 358/1.18 |
| 7,064,854 B2 | 6/2006 | Idehara | |
| 7,106,468 B2 | 9/2006 | Jinbo et al. | |
| 2003/0025935 A1 * | 2/2003 | Somei .......................... 358/1.15 |
| 2003/0030543 A1 * | 2/2003 | Castle et al. ................. 340/5.74 |
| 2005/0264846 A1 * | 12/2005 | Tsuzuki ....................... 358/1.18 |

FOREIGN PATENT DOCUMENTS

| JP | 2002-86846 | 3/2002 |
| JP | 2002-207400 | 7/2002 |
| JP | 2004-64715 | 2/2004 |

OTHER PUBLICATIONS

Japanese Office Action mailed Jul. 15, 2008 directed towards counterpart foreign application No. 2006-188860; 4 pages.

* cited by examiner

*Primary Examiner* — Thomas J Lett

(74) *Attorney, Agent, or Firm* — Morrison & Foerster LLP

(57) ABSTRACT

In order to shorten the waiting time and to prevent confidential data from being seen by others, an MFP has a distance measuring portion to communicate with a radio communication terminal and measure a distance between the MFP and the radio communication terminal, a print-job acquiring portion to acquire print data, an image-forming portion to form an image, and an image forming control portion to start a preparation operation to cause the image-forming portion to form an image, upon reduction of the measured distance equal to or below a first threshold value, and to cause the image-forming portion to form an image based on the acquired print data, upon reduction of the measured distance equal to or below a second threshold value smaller than the first threshold value.

22 Claims, 16 Drawing Sheets

F I G. 7A

REGISTERED USER INFORMATION OF MFP 100

| NUMBER | USER IDENTIFICATION INFORMATION | DEPARTMENT | E-MAIL ADDRESS | FACE IMAGE | PASSWORD | TERMINAL IDENTIFICATION INFORMATION |
|---|---|---|---|---|---|---|
| 1 | DAVID | SECRETARY DEPARTMENT | david@xxx.jp | david.jpg | xxx | C01 |

F I G. 7B

REGISTERED USER INFORMATION OF MFP 100A

| NUMBER | USER IDENTIFICATION INFORMATION | DEPARTMENT | E-MAIL ADDRESS | FACE IMAGE | PASSWORD | TERMINAL IDENTIFICATION INFORMATION |
|---|---|---|---|---|---|---|
| 2 | JULIE | PLANNING DEPARTMENT | julie@xxx.jp | julie.jpg | xxxx | C02 |

F I G. 7C

REGISTERED USER INFORMATION OF MFP 100B

| NUMBER | USER IDENTIFICATION INFORMATION | DEPARTMENT | E-MAIL ADDRESS | FACE IMAGE | PASSWORD | TERMINAL IDENTIFICATION INFORMATION |
|---|---|---|---|---|---|---|
| 3 | TED | GENERAL AFFAIRS DEPARTMENT | ted@xxx.jp | ted.jpg | xxxxx | C03 |

F I G. 7D

REGISTERED USER INFORMATION OF MFP 100C

| NUMBER | USER IDENTIFICATION INFORMATION | DEPARTMENT | E-MAIL ADDRESS | FACE IMAGE | PASSWORD | TERMINAL IDENTIFICATION INFORMATION |
|---|---|---|---|---|---|---|
| 4 | MICHAEL | DEVELOPMENT DEPARTMENT | michael@xxx.jp | michael.jpg | xxxxx | C04 |
| 5 | SUSAN | RESEARCH DEPARTMENT | susan@xxx.jp | susan.jpg | xxxxxx | C05 |

F I G. 8

USER DATA

| NUMBER | USER IDENTIFICATION INFORMATION | DEPARTMENT | E-MAIL ADDRESS | FACE IMAGE | PASSWORD | HOME TERMINAL (APPARATUS IDENTIFICATION INFORMATION) | LOCATION OF HOME TERMINAL | TERMINAL IDENTIFICATION INFORMATION |
|---|---|---|---|---|---|---|---|---|
| 1 | DAVID | SECRETARY DEPARTMENT | david@xxx.jp | david.jpg | xxx | IP ADDRESS OF MFP 100 | COPY ROOM, 19TH FLOOR | C01 |
| 2 | JULIE | PLANNING DEPARTMENT | julie@xxx.jp | julie.jpg | xxxx | IP ADDRESS OF MFP 100A | PLANNING DEPARTMENT, 5TH FLOOR | C02 |
| 3 | TED | GENERAL AFFAIRS DEPARTMENT | ted@xxx.jp | ted.jpg | xxxxx | IP ADDRESS OF MFP 100B | MEETING ROOM, 4TH FLOOR | C03 |
| 4 | MICHAEL | DEVELOPMENT DEPARTMENT | michael@xxx.jp | michael.jpg | xxxxx | IP ADDRESS OF MFP 100C | MEETING ROOM, 14TH FLOOR | C04 |
| 5 | SUSAN | RESEARCH DEPARTMENT | susan@xxx.jp | susan.jpg | xxxxxx | IP ADDRESS OF MFP 100C | LABORATORY, 7TH FLOOR | C05 |

| USER IDENTIFICATION INFORMATION | PRINT-JOB IDENTIFICATION INFORMATION |

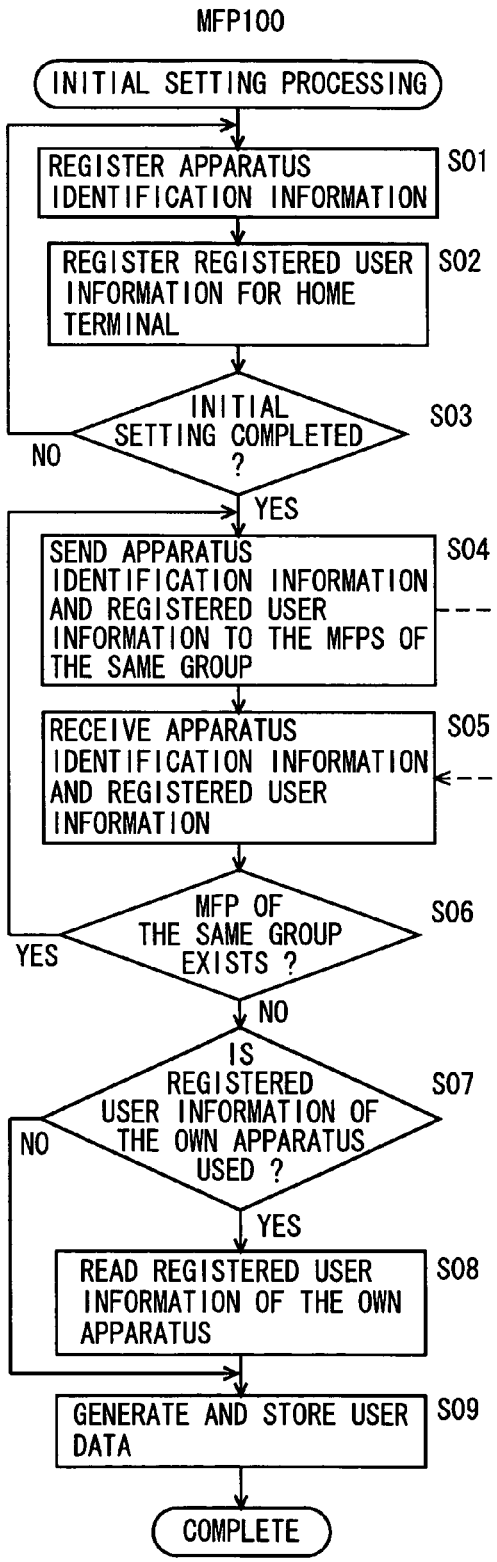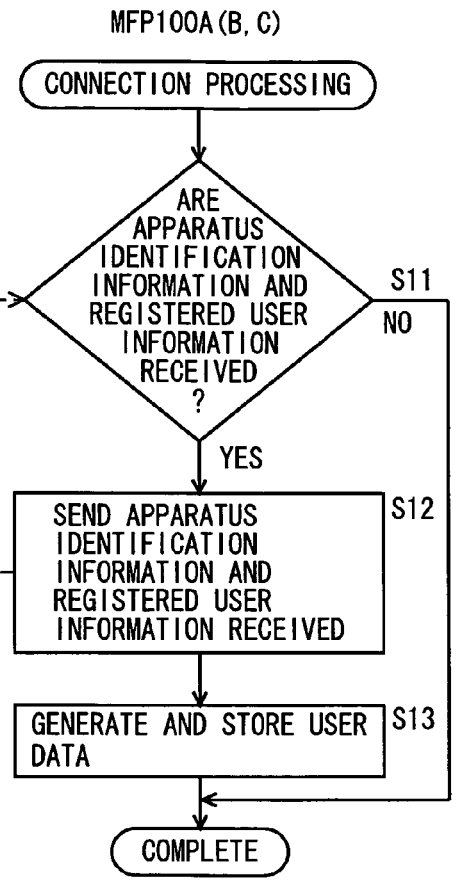
FIG. 10A — MFP100
FIG. 10B — MFP100A(B, C)

F I G. 1 1

SECOND USER DATA OF MFP100

| NUMBER | USER IDENTIFICATION INFORMATION | DEPARTMENT | E-MAIL ADDRESS | FACE IMAGE | PASSWORD | HOME TERMINAL (APPARATUS IDENTIFICATION INFORMATION) | LOCATION OF HOME TERMINAL | TERMINAL IDENTIFICATION INFORMATION |
|---|---|---|---|---|---|---|---|---|
| 2 | JULIE | PLANNING DEPARTMENT | julie@xxx.jp | julie.jpg | xxxx | IP ADDRESS OF MFP 100A | PLANNING DEPARTMENT, 5TH FLOOR | C02 |
| 3 | TED | GENERAL AFFAIRS DEPARTMENT | ted@xxx.jp | ted.jpg | xxxxx | IP ADDRESS OF MFP 100B | MEETING ROOM, 4TH FLOOR | C03 |
| 4 | MICHAEL | DEVELOPMENT DEPARTMENT | michael@xxx.jp | michael.jpg | xxxxx | IP ADDRESS OF MFP 100C | MEETING ROOM, 14TH FLOOR | C04 |
| 5 | SUSAN | RESEARCH DEPARTMENT | susan@xxx.jp | susan.jpg | xxxxxx | IP ADDRESS OF MFP 100C | LABORATORY, 7TH FLOOR | C05 |

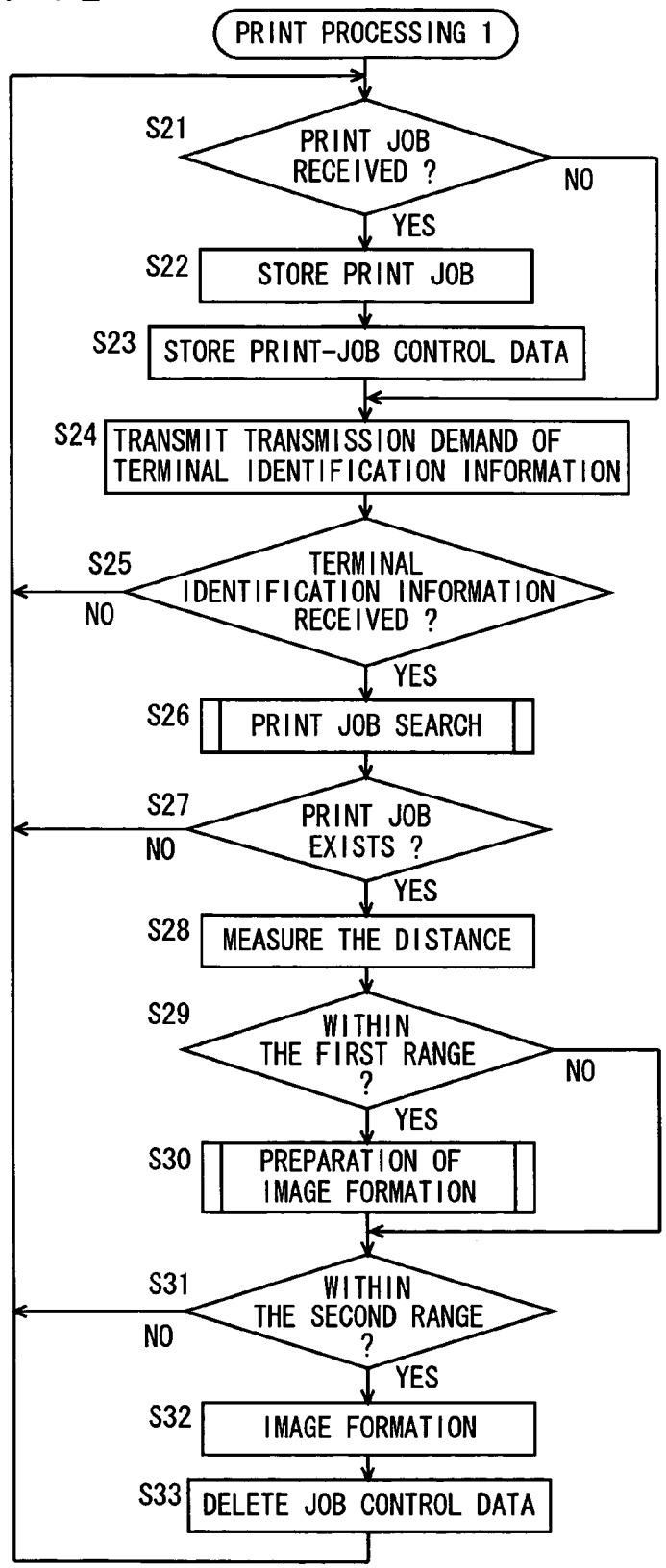

F I G. 1 3
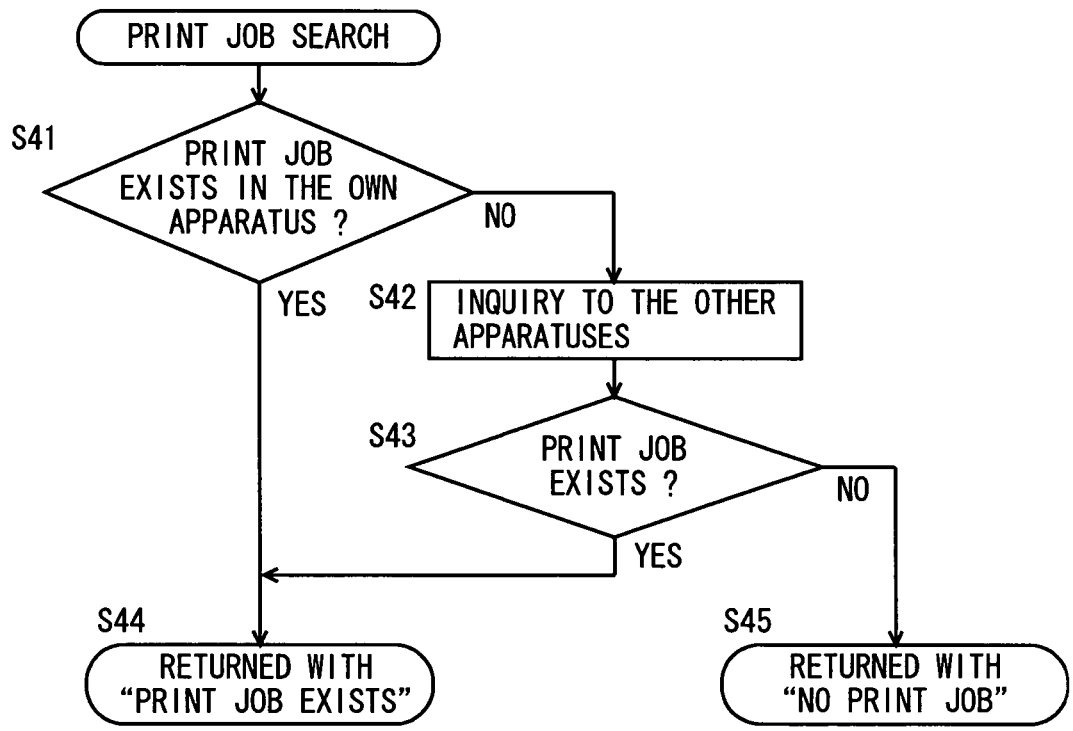

IMAGE-FORMING APPARATUS TO FORM AN IMAGE BASED ON PRINT DATA, PRINT-JOB CONTROL METHOD, AND PRINT-JOB CONTROL PROGRAM EMBODIED IN COMPUTER READABLE MEDIUM

READABLE MEDIUM

This application is based on Japanese Patent Application No. 2006-188860 filed with Japan Patent Office on Jul. 10, 2006, the entire content of which is hereby incorporated by reference.

BACKGROUND OF THE INVENTION

1. Field of the Invention

The present invention relates to an image-forming apparatus to form an image based on print data, a print-job control method executed in the image-forming apparatus, and a print-job control program embodied in a computer readable medium and executed in the image-forming apparatus.

2. Description of the Related Art

In recent years, it has become common to connect image-forming apparatuses such as printers to networks. In this form of use, image-forming apparatuses are used in common by a plurality of users. Here, when a user instructs a computer connected to a network to transmit print data to an image-forming apparatus, and when the image-forming apparatus is located at some distance from the computer, it could be possible that another user reaches the image-formed piece of paper before the user. In order to solve this problem, an image-forming apparatus is equipped with a confidential print function such that when receiving a password along with print data from a computer, the image-forming apparatus does not form an image of the print data until the password is input. With this confidential print function, the user who has instructed a computer to transmit the print data can cause the image-forming apparatus to form an image while being beside the apparatus. This prevents the piece of paper having the formed image from being seen by others. However, for image formation, the user is required to input the password into the image-forming apparatus. For example, in the case of a power saving mode, in which image-forming apparatuses consume low power, the image-forming apparatus does not form an image during the time before transition to the stand-by mode, in which images are formable. Thus, the user has to wait beside the image-forming apparatus in the mean time.

Japanese Patent Application Publication No. 2004-64715, by the Applicant, describes an image-forming apparatus having an image-forming means to form an image based on print data received from a client terminal connected to the means via a network. The image-forming apparatus further has a detecting means to detect if a mobile terminal corresponding to the client terminal that has transmitted the print data enters a predetermined range, and a control means to control the image-forming means to stand by instead of starting to form an image based on the print data until the mobile terminal is detected to have entered the predetermined range, and to release the stand-by state if the mobile terminal is detected to have entered the predetermined range. However, if the predetermined range is set to be large in order for a shorter waiting time, the following situation, for example, is possible. If the user holding the mobile terminal moves in the predetermined range without intending to fetch a piece of paper output from the image-forming apparatus, the image-forming apparatus automatically forms an image and others might access the output piece of paper. Conversely, if the predetermined range is set to be small in order to prevent mal-operation, the user has to wait for a longer time, thus compromising user convenience.

SUMMARY OF THE INVENTION

It is an object of the present invention to solve the above problems. It is another object of the present invention to provide an image-forming apparatus that provides a shortened waiting time and prevents confidential data from being accessed by others.

It is another object of the present invention to provide a print-job control method that provides a shortened waiting time and prevents confidential data from being accessed by others. It is another object of the present invention to provide a print-job control program embodied in a computer readable medium and providing a shortened waiting time and prevents confidential data from being accessed by others.

According to an aspect of the present invention, there is provided an image-forming apparatus comprising: a distance measuring portion to communicate with a radio communication terminal and measure a distance between the image-forming apparatus and the radio communication terminal; a print data acquiring portion to acquire print data; an image-forming portion to form an image; a preparation operation starting portion to start a preparation operation to cause the image-forming portion to form an image, upon reduction of the measured distance equal to or below a first threshold value; and an image-forming starting portion to cause the image-forming portion to form an image based on the acquired print data, upon reduction of the measured distance equal to or below a second threshold value smaller than the first threshold value.

According to this aspect, a distance between the image-forming apparatus and the radio communication terminal is measured, a preparation operation to form an image is started upon reduction of the measured distance equal to or below the first threshold value, and an image is formed based on the print data upon reduction of the measured distance equal to or below the second threshold value. When a user holding the radio communication terminal comes near to the image-forming apparatus equal to or below the first threshold value, a preparation operation to form an image is started, and thus, the print data can be immediately formed into an image when the user's distance to the apparatus is equal to or below the second threshold value. In addition, since the second threshold value can be set to be small, mal-operation is prevented. As a result, an image-forming apparatus that provides a shortened waiting time and prevents confidential data from being accessed by others is provided.

According to another aspect of the present invention, there is provided a print-job control method executed in an image-forming apparatus having an image-forming portion to form an image, the method having: communicating with a radio communication terminal and measuring a distance between the image-forming apparatus and the radio communication terminal; acquiring print data; starting a preparation operation to cause the image-forming portion to form an image, upon reduction of the measured distance equal to or below a first threshold value; and causing the image-forming portion to form an image based on the acquired print data, upon reduction of the measured distance equal to or below a second threshold value smaller than the first threshold value.

According to this aspect, a print-job control method that provides a shortened waiting time and prevents confidential data from being accessed by others is provided.

According to another aspect of the present invention, there is provided a print-job control program embodied in a computer readable medium, the print-job control program being executed in an image-forming apparatus having an image-forming portion to form an image, the print-job control program causing the image-forming apparatus to execute steps including: communicating with a radio communication terminal and measuring a distance between the image-forming apparatus and the radio communication terminal; acquiring print data; starting a preparation operation to cause the image-forming portion to form an image, upon reduction of the measured distance equal to or below a first threshold value; and causing the image-forming portion to form an image based on the acquired print data, upon reduction of the measured distance equal to or below a second threshold value smaller than the first threshold value.

According to this aspect, a print-job control program embodied in a computer readable medium and providing a shortened waiting time and prevents confidential data from being accessed by others is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A-7D are diagrams showing examples of registered user information stored in the HDD of the MFP.

FIG. 8 is a first diagram showing an example of user data.

FIG. 9 is a diagram showing an example of the format of job control data.

FIG. 10A is a flow chart showing an example of the flow of an initial setting processing. FIG. 10B is a flow chart showing an example of the flow of a connection processing.

FIG. 11 is a second diagram showing an example of user data.

FIG. 12 is a flow chart showing an example of the flow of a print processing.

FIG. 13 is a flow chart showing an example of the flow of a print-job search processing.

DESCRIPTION OF THE PREFERRED EMBODIMENTS

Figure 1:
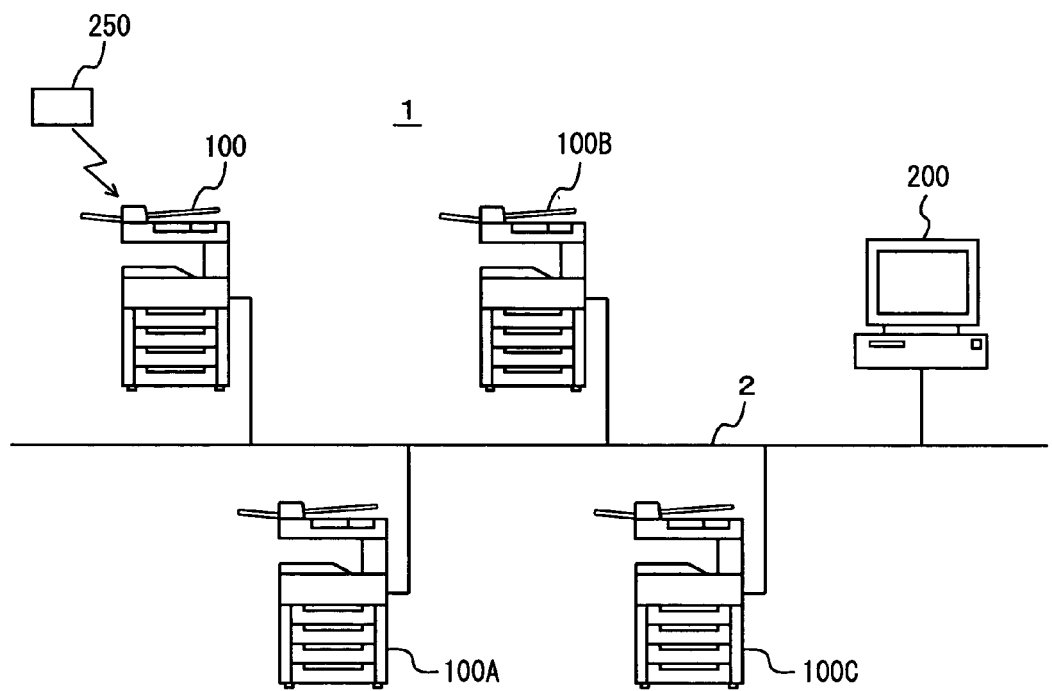
FIG. 1 is a schematic diagram of an image-forming system according to an embodiment of the present invention.

Embodiments of present invention will be described below referring to the drawings. In the following description, parts having like functions and names will denoted with like numerals, and therefore the description thereof will not be repeated.

FIG. 1 is a schematic diagram of an image-forming system according to an embodiment of the present invention. Referring to FIG. 1, an image-forming system 1 includes: compound machines (hereinafter referred to as MFPs) 100, 100A, 100B, and 100C, and a personal computer (hereinafter referred to as a PC) 200, respectively connected to a network 2; and a mobile communication terminal 250. The MFPs 100, 100A, 100B, and 100C have the same structures and functions, and therefore the MFP 100 will be taken as an example here unless stated otherwise.

The MFP (Multi Functional Peripheral) 100 is an image-forming apparatus and includes a scanner to read text, an image-forming portion to form an image on a recording medium such as paper based on image data, and a facsimile. The MFP is equipped with an image reading function, a copying function, and a facsimile transmitting and receiving function. While in this embodiment the MFP 100 is taken as an example of the image-forming apparatus, a printer, facsimile, or the like equipped with the image-forming function can be taken as an example in place of the MFP 100.

The network 2 is a local area network (LAN), and the connection can be either by wire or radio. Also, the network 2 is not limited to a LAN and can be a wide area network (WAN), the Internet, or the like. The MFPs 100, 100A, 100B, and 100C can communicate with one another via the network 2, and the MFPs 100, 100A, 100B, and 100C can respectively communicate with the PC 200 via the network 2.

The PC 200 is a terminal and a common computer. The hardware structure of the PC 200 and the function thereof, which are well known, will not be elaborated upon here. In the PC 200, at least a printer driver program to control the MFPs 100, 100A, 100B, and 100C is installed. In the printer driver program, at least user identification information for identifying the user of the PC 200 is registered. When the printer driver program is executed in the PC 200, the PC 200 converts data generated by execution of a certain application program other than the printer driver program into print data and transmits a print job including the print data to one of the MFPs 100, 100A, 100B, and 100C. The print job includes job information in addition to the print data. The job information includes the user identification information registered in the printer driver program, image-forming conditions such as the number of sheets, and print-job identification information for identifying the print job.

The print data is such data that data generated by execution of a certain application program is converted into print data described in PDL (Page Description Language) such as PCL (Printer Control Language). The job information is data described in, for example, PJL (Printer Job Language). For example, when the PC 200 transmits the print job to the MFP 100, the MFP 100 forms the print data into an image according to the job information in the print job.

The mobile communication terminal 250 at least has a memory and a data communication portion to have short-range radio communication with each of the MFPs 100, 100A, 100B, and 100C. The mobile communication terminal 250 here is an RFID (Radio Frequency Identification) tag. The mobile communication terminal 250 is attached to, for example, a nameplate or a card worn by a user. The radio communication between the mobile communication terminal 250 and each of the MFPs 100, 100A, 100B, and 100C can be either by a communication medium of a Bluetooth standard using radio wave or electromagnetic wave, or a communication medium of an IrDA (Infrared Data Association) standard using infrared rays. Also, the mobile communication terminal 250 can be a PDA (Personal Digital Assistants), a mobile phone, or the like having a data communication portion.

In the image-forming system 1 according to this embodiment, when a user inputs into the PC 200 an instruction for the MFP 100 to print data, the PC 200 generates a print job including print data and image-forming conditions and transmits the print job to the MFP 100. Job information included in the print job includes user identification information for identifying the user and the image-forming conditions. The MFP 100 does not execute the received print job immediately but stores the print job temporarily. The mobile communication terminal 250 stores in its memory unique terminal identification information assigned to the mobile communication terminal 250. When the user who has made the print instruction to the PC 200 carries the mobile communication terminal 250 and approaches the MFP 100, then radio communication is possible between the mobile communication terminal 250 and the MFP 100, and the MFP 100 receives the terminal identification information from the mobile communication terminal 250. The MFP 100, by communicating with the mobile communication terminal 250, measures the distance between the MFP 100 and the mobile communication terminal 250. When the MFP 100 judges that the user enters a first range determined based on the MFP 100, then the MFP 100 starts a preparation operation necessary to execute the temporarily stored print job, and turns the print data included in the print job into an immediately image-formable state according to the image-forming conditions. At this stage, the MFP 100 does not form the print data into an image. When the user further approaches the MFP 100 and the MFP 100 judges that the user enters a second range determined based on the MFP 100, then the MFP 100 immediately forms the print data into an image. This will be described in further detail below.

Figure 2:
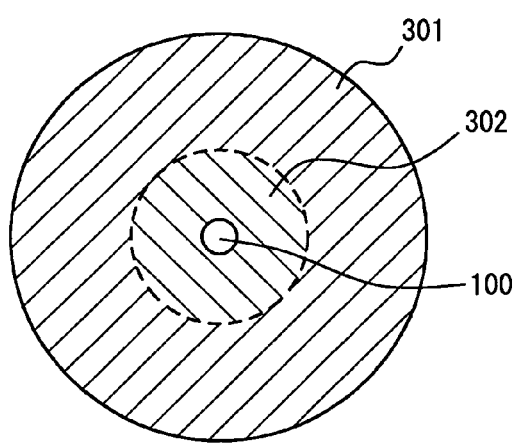
FIG. 2 is a diagram illustrating a first range and a second range that are based on an MFP.

FIG. 2 is a diagram illustrating the first range and the second range that are based on the MFP 100. Referring to FIG. 2, a first range 301 is within a first distance from the MFP 100 and greater than a second distance. A second range 302 is within the second distance from the MFP 100. The second distance is shorter than the first distance, and here the first distance is set to be 10 m and the second distance is set to be 2 m. For example, when the user happens to approach the MFP 100 and enters the first range without intending to fetch a sheet from MFP 100, an image is not formed unless the user enters the second range. Thus, an image is prevented from being formed erroneously. When the user intends to fetch a sheet from the MFP 100, a preparation for image formation starts when the user enters the first range, and image formation immediately starts when the user enters the second range. Thus, when the user reaches the MFP 100, image formation is in the state of completion or in a half-completed state. This shortens the waiting time for the user while the MFP 100 forms an image.

Figure 3:
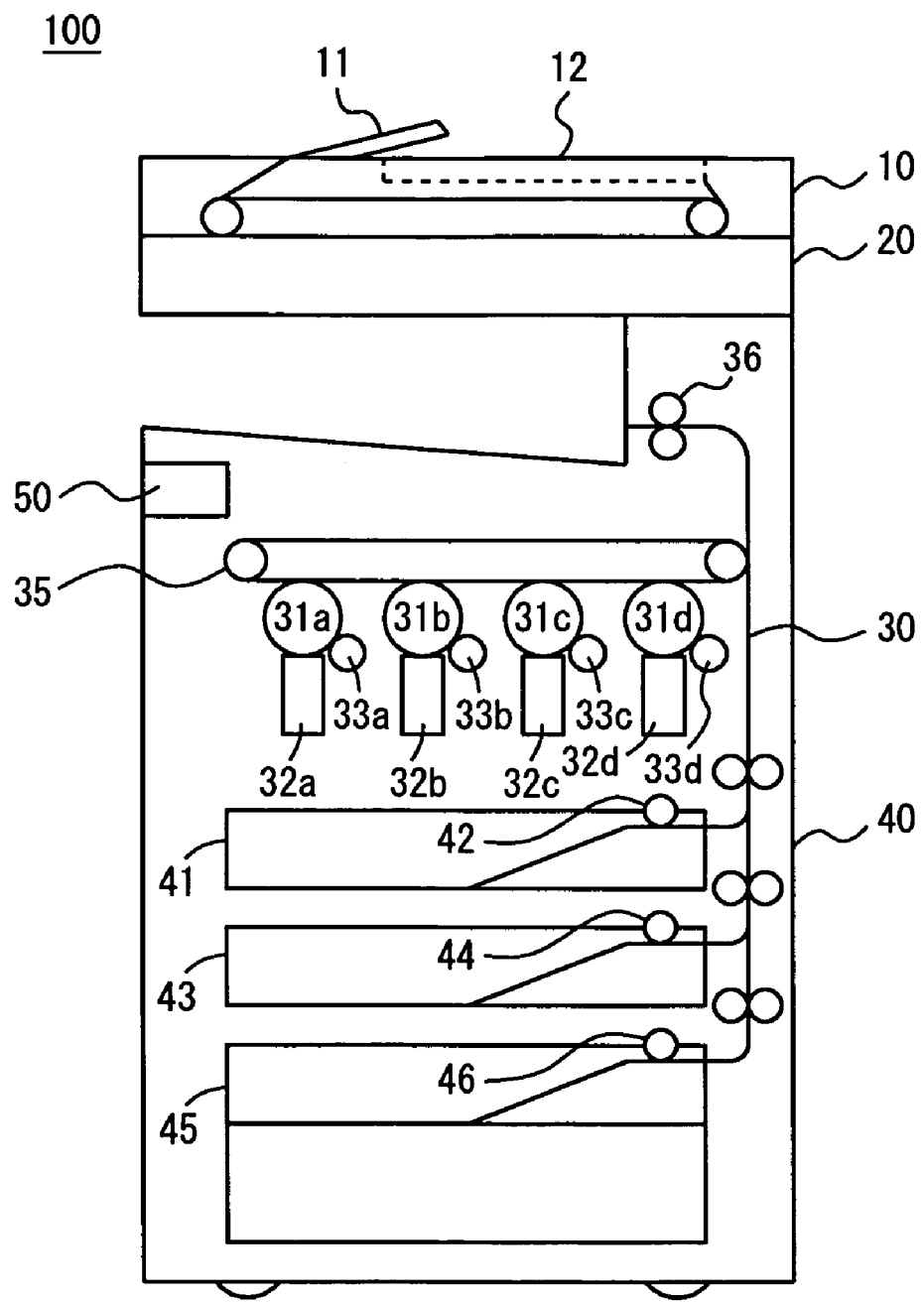
FIG. 3 is a cross sectional view of the MFP, showing the internal structure thereof.

FIG. 3 is a cross sectional view of the MFP, showing the internal structure thereof. Referring to FIG. 3, the MFP 100 includes an automatic document feeding device (ADF) 10, a text reading portion 20, an image-forming portion 30, a paper feeding portion 40, and a main circuit 50 to control the MFP 100 as a whole.

The ADF 10 automatically conveys, in a one-by-one manner, a plurality of document sheets set on a document feeding tray 11 to a predetermined text reading position provided on platen glass of the text reading portion 20, and discharges document sheets whose text has been read out by the text reading portion 20 to a document discharging tray 12. The text reading portion 20 includes a light source to radiate light to a document sheet conveyed to the text reading position, and a photoelectric converting element to receive light reflected by the document sheet. The text reading portion 20 scans a text image conforming to the document size. The photoelectric converting element converts the received light into reading data in the form of an electric signal, and outputs it to the image-forming portion 30.

The paper feeding portion 40 has paper feeding trays 41, 43, and 45 to store sheets of paper therein, and pick-up rollers 42, 44, and 46 to pick up the sheets of paper, and conveys them to the image-forming portion 30.

The image-forming portion 30 forms an image by a well known electro-graphic method, and has photoreceptor drums 31a, 31b, 31c, 31d, light exposure units 32a, 32b, 32c, and 32d, development units 33a, 33b, 33c, and 33d, a transcription belt 35, and a pair of fixing rollers 36. The light exposure units 32a, 32b, 32c, and 32d subject read-out data input from the text reading portion 20 to various kinds of data processing such as shading correction, convert the processed data into a driving signal for driving a laser diode for each main scanning line, and scan laser light on each of the photoreceptor drums 31a, 31b, 31c, 31d. Thus, an electrostatic latent image is formed on each of the photoreceptor drums 31a, 31b, 31c, 31d. The development units 33a, 33b, 33c, and 33d correspond to four colors, yellow, magenta, cyan, and black, respectively. Toner cartridges containing toners of respective colors are mounted to the development units 33a, 33b, 33c, and 33d. The development units 33a, 33b, 33c, and 33d place each of the toners on each electrostatic latent image formed on the photoreceptor drums 31a, 31b, 31c, 31d in order to form toner images. The toner images formed on the photoreceptor drums 31a, 31b, 31c, 31d are transcribed onto the transcription belt 35 by a transcribing charger. The transcription belt 35 superposes all the toner images on the photoreceptor drums 31a, 31b, 31c, 31d, which correspond to each color, and transcribes the superposed toner images onto a sheet of paper conveyed from the paper feeding portion 40. The sheet of paper on which the toner images are transcribed is heated by the pair of fixing rollers 36 and discharged to the discharging tray. The toners heated by the pair of fixing rollers 36 are melted and fixed on the sheet of paper.

Figure 4:
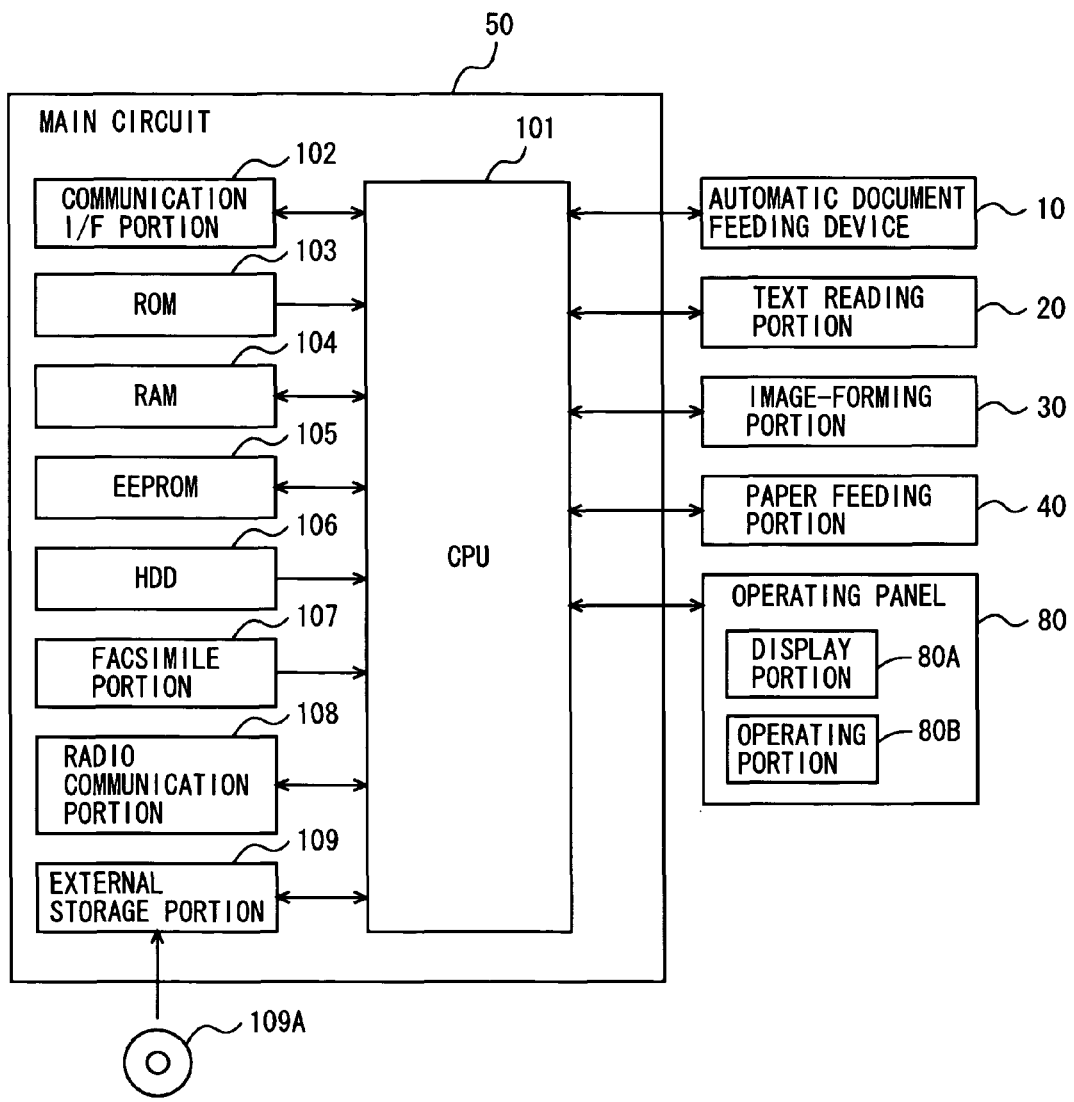
FIG. 4 is a block diagram showing an example of the main circuit of the MFP.

FIG. 4 is a block diagram showing an example of the main circuit of the MFP 100. Referring to FIG. 4, the main circuit 50 includes a CPU 101, a communication interface (I/F) portion 102, a ROM (Read Only Memory) 103, a RAM (Random Access Memory) 104, an EEPROM (Electronically Erasable and Programmable ROM) 105, a hard disc drive (HDD) 106 serving as a mass storage, a facsimile portion 107, a radio communication portion 108, and an external storage portion 109 having a CD-ROM (Compact Disc-ROM) 109A mounted therein. The CPU 101 is connected to the automatic document feeding device 10, the text reading portion 20, the image-forming portion 30, the paper feeding portion 40, and an operating panel 80, and controls the MFP 100 as a whole.

The ROM 103 stores a print-job control program executed by the CPU 101, or data necessary for execution of the print-job control program. The RAM 104 is used as a work area for the CPU 101 to execute the program. The RAM 104 temporarily stores read-out data (image data) transmitted continuously from the text reading portion 20.

The operating panel 80 includes a display portion 80A and an operating portion 80B. The display portion 80A is a display device such as a liquid crystal display (LCD) device and an organic ELD (Electro Luminescence Display), and displays an instruction menu for a user, information concerning acquired image data, and the like. The operating portion 80B has a plurality of keys and receives input of data such as various instructions, characters, and numbers input by the user's operation and corresponding to the keys. The operating portion 80B further includes a touch panel provided on the display portion 80A.

The communication I/F portion 102 is an interface to connect the MFP 100 to the network 2. Print data transmitted from the PC 200 is received at the communication I/F portion 102 and accepted at the CPU 101.

The facsimile portion 107 is connected to the public switched telephone network (PSTN), and transmits facsimile data to the PSTN or receives facsimile data from the PSTN. Also, the facsimile portion 107 stores received facsimile data in the HDD 106 or outputs the received facsimile data to the image-forming portion 30. The image-forming portion 30 prints the facsimile data received by the facsimile portion 107 onto a sheet of paper. The facsimile portion 107 converts data stored in the HDD 106 into facsimile data and transmits it to a facsimile connected to the PSTN.

The radio communication portion 108 communicates by radio with the mobile communication terminal 250 based on, for example, the GAP (Generic Access Profile) of a Bluetooth standard. Also, the radio communication portion 108 outputs the strength of a received radio wave to the CPU 101. The CPU 101 measures the distance to the mobile communication terminal 250 based on the radio wave strength input from the radio communication portion 206.

In the external storage portion 109, the CD-ROM 109A is mounted. The CPU 101 can access the CD-ROM 109A via the external storage portion 109. While, as an example, the CPU 101 executes the print-job control program stored in the ROM 103, the print-job control program can be stored in the CD-ROM 109A and loaded in the RAM 104 for execution. The program executed by the CPU 101 is not limited to the print-job control program stored in the CD-ROM 109A. The print-job control program can be stored in the EEPROM 105 and loaded in the RAM 104 for execution. Using the EEPROM 105 enables rewriting or additional writing of the print-job control program. Thus, it is possible that the PC 200 or the like connected to the network 2 rewrites the print-job control program stored in the EEPROM 105 of the MFP 100, or additionally writes a new print data output program. Further, it is possible that the MFP 100 downloads a print-job control program from the PC 200 the like connected to the network 2 and stores the print-job control program in the EEPROM 105.

These programs are not limited to the example where they are read out from the CD-ROM 109A for execution. It is possible that the print-job control program stored in the CD-ROM 109A is temporarily stored in the HDD 106, and the program is loaded from the HDD 106 to the RAM 104 for execution. The term program, as used herein, includes a source program, a compressed program, and an encoded program, as well as programs directly executable by the CPU 101.

The recording medium to store the print-job control program is not limited to the CD-ROM 109A but can be a flexible disc, a cassette tape, an optical disc (CD-ROM (Compact Disc-ROM), MO (Magnetic Optical Disc), MD (Mini Disc), DVD (Digital Versatile Disc)), an IC card, an optical card, or a semiconductor memory such as a Mask ROM, an EPROM (Erasable Programmable ROM), and an EEPROM (Electronically Erasable And Programmable ROM).

The MFP 100 according to this embodiment switches the operation mode to one of a stand-by mode in which the image-forming portion 30 can immediately form an image, a sleep mode in which the power consumption of the MFP 100 as a whole is the lowest, and a low power mode in which the power consumption of the MFP 100 as a whole is higher than in the sleep mode and lower than in the stand-by mode. For example, in the stand-by mode, the CPU 101 controls the temperature of the pair of fixing rollers 36 of the image-forming portion 30 to maintain the optimum temperature for the pair of fixing rollers 36 to melt the toner. In the sleep mode, the temperature of the pair of fixing rollers 36 is not controlled and thus reduces with time. When the temperature of the pair of fixing rollers 36 reduces, it takes some time before the temperature reaches the optimum temperature for melting the toner on the next occasion. Thus, if the operation mode is switched from the sleep mode to the stand-by mode, the stand-by mode is not available immediately; the stand-by mode comes after the temperature of the pair of fixing rollers 36 has reached the optimum temperature for melting the toner. In the low power mode, the temperature of the pair of fixing rollers 36 is controlled below the optimum temperature for melting the toner. Thus, if the operation mode is switched from the low power mode to the stand-by mode, the stand-by mode is not available immediately; the stand-by mode comes after the temperature of the pair of fixing rollers 36 has reached the optimum temperature for melting the toner. The time required for the image formable state before transition from the low power mode to the stand-by mode is shorter than the time required for the image formable state before transition from the sleep mode to the stand-by mode.

Figure 5:
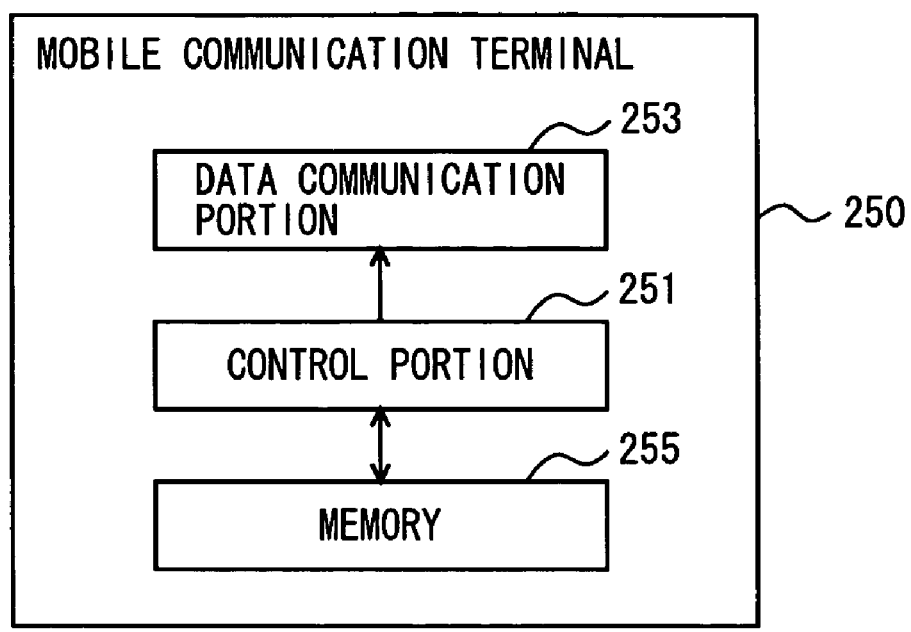
FIG. 5 is a diagram showing an example of the hardware of a mobile communication terminal.

FIG. 5 is a diagram showing an example of the hardware of the mobile communication terminal 250. Referring to FIG. 5, the mobile communication terminal 250 includes a control portion 251 to control the mobile communication terminal 250 as a whole, a data communication portion 253 to communicate with any of the 100, 100A, 100B, and 100C, and a memory 255 to store terminal identification information. When the data communication portion 253 receives a transmission demand for the terminal identification information from any of the 100, 100A, 100B, and 100C, then the control portion 251 reads out the terminal identification information stored in the memory 255, and causes the data communication portion 253 to transmit the terminal identification information.

Figure 6:
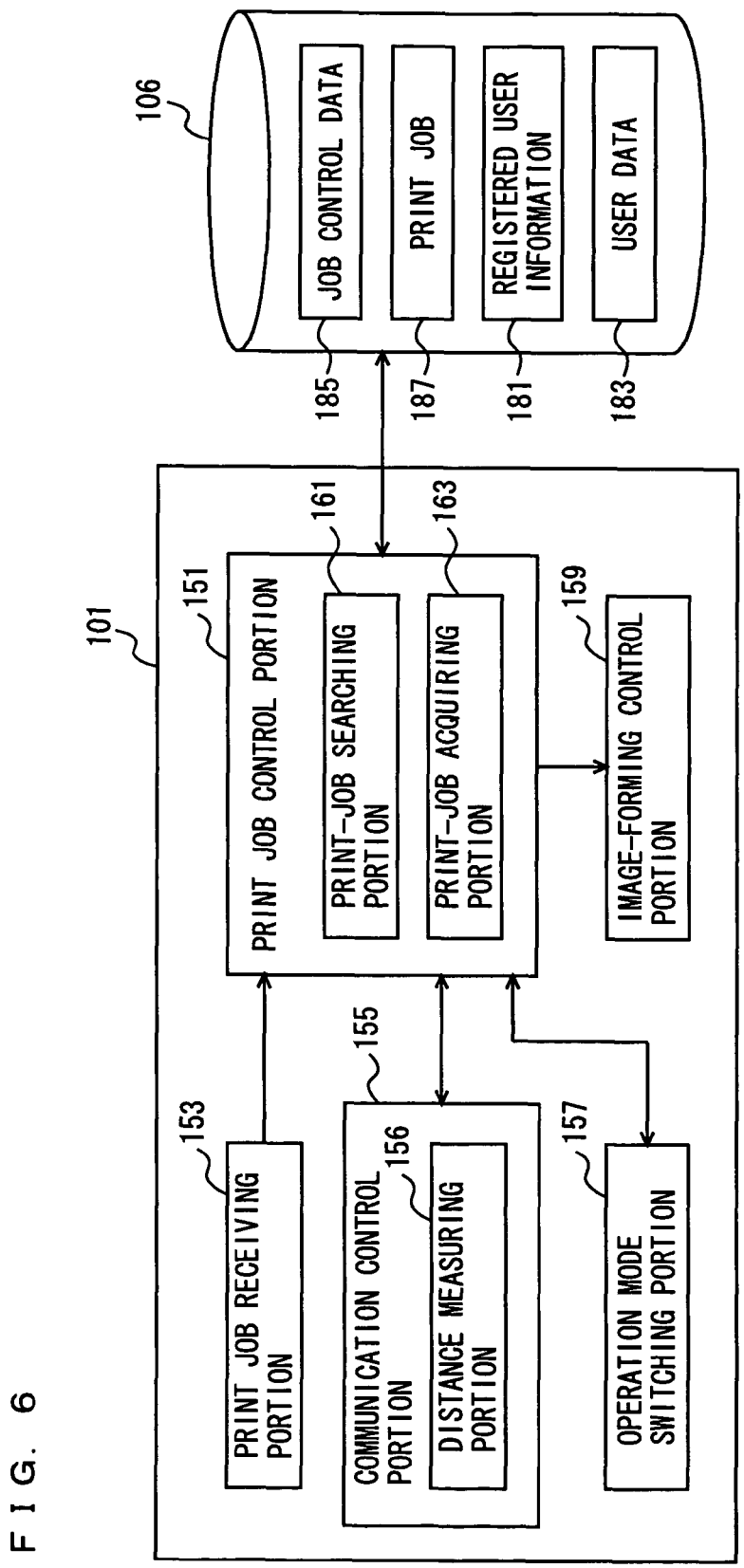
FIG. 6 is a functional block diagram showing the outline of the function of the CPU together with data stored in HDD 106.

FIG. 6 is a functional block diagram showing the outline of the function of the CPU 101 together with data stored in the HDD 106. Referring to FIG. 6, the CPU 101 includes a print-job receiving portion 153 to receive a print job, a print job control portion 151 to control the print job, a communication control portion 155 to control the radio communication portion 108, an operation mode switching portion 157 to switch the operation mode, and an image-forming control portion 159 to control the image-forming portion 30.

The HDD 106 stores a print job 187, job control data 185 to control the print job 187, registered user information 181 concerning a user registered in the MFP 100, and user data 183.

In the image-forming system 1 according to this embodiment, for each of the MFPs 100, 100A, 100B, and 100C, a user who mainly uses each is fixed. Therefore, the MFPs 100, 100A, 100B, and 100C store in each HDD 106 registered user information in order to register the user who mainly uses each. The registered user information at least includes user identification information for identifying the user and terminal identification information assigned to the mobile communication terminal 250 carried by the user. For the user identification information, the user's name can be used. Based on a user of interest, the MFP storing the user's registered user information, among the MFPs 100, 100A, 100B, and 100C, will be referred to as the "home terminal." For example, if the registered user information of a user named "David" is stored in the MFP 100, the home terminal of user David is the MFP 100. It is noted that storing registered user information in each of the MFPs 100, 100A, 100B, and 100C is for the purpose of specifying the user who mainly uses each, and that a user whose registered user information is not stored is not prohibited from using the MFPs.

Each of the MFPs 100, 100A, 100B, and 100C stores in the HDD 106 user data including the registered user information stored in all the other MFPs so that a user whose registered user information is stored in the user's home terminal can log in a terminal other than the home terminal. The user data is data that relates user identification information to apparatus identification information for identifying the home terminal, and at least includes user identification information for identifying the user and apparatus identification information for identifying the user's home terminal.

FIG. 7A is a diagram showing an example of registered user information stored in the HDD 106 of the MFP 100, FIG. 7B is a diagram showing an example of registered user information stored in the HDD 106 of the MFP 100A, FIG. 7C is a diagram showing an example of registered user information stored in the HDD 106 of the MFP 100B, and FIG. 7D is a diagram showing an example of registered user information stored in the HDD 106 of the MFP 100C. The registered user information includes user identification information, associated information, certification information, and terminal identification information. The user identification information is unique information such as a user ID composed of characters and symbols, a user's name, or the like. The associated information is information associated with the user such as the department the user belongs to, an electronic mail address assigned to the user, and face image data obtained by photographing the user's face. The certification information is information used for certification of the user at the time of login, and a password is used here. Face image data can be used for the certification information. When the certification information is by biometrics, then fingerprints, voiceprints, iris patterns, vein patterns, or the like are used. The terminal identification information is identification information assigned to the mobile communication terminal 250 carried by the user who is assigned user identification information.

FIG. 8 is a first diagram showing an example of user data. The user data is generated in each of MFPs 100, 100A, 100B, and 100C by carrying out an initial setting processing, described later, in the MFP 100, and carrying out a connection processing, described later, in the other MFPs 100A, 100B, and 100C. The user data is then stored in each HDD 106. The user data includes a number, registered user information, the apparatus identification information of the home terminal, and the location of the home terminal. The user data may at least include the user identification information of the user, the apparatus identification information of the user's home terminal, and the terminal identification information of the mobile communication terminal 250 carried by the user.

Thus, the same user data is generated and stored in one group composed of the MFPs 100, 100A, 100B, and 100C. The image-forming system 1 composed of the MFPs 100, 100A, 100B, and 100C is thus formed. With the image-forming system 1, based on user data, a user can be identified who has, as the home terminal, one of the MFPs 100, 100A, 100B, and 100C. When a user who has, as the home terminal, one of the MFPs 100, 100A, 100B, and 100C carries the mobile communication terminal 250 and approaches any of the MFPs 100, 100A, 100B, and 100C, one of the MFPs 100, 100A, 100B, and 100C that detects the mobile communication terminal 250 can judge which one of the users is approaching using the user data.

Referring back to FIG. 6, when the communication I/F portion 102 receives a print job from the PC 200, the print-job receiving portion 153 accepts the print job from the communication I/F portion 102. The print-job receiving portion 153 outputs the accepted print job to the print-job control portion 151.

The communication control portion 155 controls the radio communication portion 108 and causes it to communicate with the mobile communication terminal 250. Specifically, the communication control portion 155 causes the radio communication portion 108 to periodically output a transmission demand for terminal identification information. When the radio communication portion 108 receives terminal identification information transmitted by a mobile communication terminal 250 that has received the transmission demand, the communication control portion 155 accepts the terminal identification information from the radio communication portion 108. In addition, the radio communication portion 108 measures the strength of a radio wave output from the mobile communication terminal 250, and the communication control portion 155 accepts, with the terminal identification information, the radio wave strength from the radio communication portion 108.

The communication control portion 155 includes a distance measuring portion 156. The distance measuring portion 156 measures the distance to the mobile communication terminal 250 using the strength of a radio wave transmitted from the mobile communication terminal 250. Specifically, the distance measuring portion 156 measures, using the strength of a radio wave (electric field strength) received by the radio communication portion 108, how distant the mobile communication terminal 250 is from the MFP 100. It is possible that the distance measuring portion 156 demands the mobile communication terminal 250 to transmit data indicating the value of the strength of a radio wave received by the mobile communication terminal 250, and calculates the difference between the value of the radio wave strength transmitted from the mobile communication terminal 250 and the value of the strength of a radio wave transmitted by the radio communication portion 108 to the mobile communication terminal 250, in order to obtain the distance using the difference.

The radio communication portion 108 compares the distance measured by the distance measuring portion 156 with a predetermined first distance and a predetermined second distance. The first distance is longer than the second distance, and here the first distance is 10 m and the second distance is 2 m. When the distance measured by the distance measuring portion 156 is below the first distance and above the second distance, the radio communication portion 108 outputs a first signal indicating that the mobile communication terminal 250 is within the first range, which is based on the MFP 100, to the print-job portion 151. When the distance measured by the distance measuring portion 156 is below the second distance, the radio communication portion 108 outputs a second signal indicating that the mobile communication terminal 250 is within the second range, which is based on the MFP 100, to the print-job control portion 151.

While the distance measuring portion 156 measures the distance to the mobile communication terminal 250 using the strength of a radio wave output by the mobile communication terminal 250, it is also possible that the radio communication portion 108 transmits transmission demands of terminal identification information using two different radio wave strengths and detects if the mobile communication terminal 250 is within the first range or the second range, which is based on the MFP 100. For example, the radio communication portion 108 transmits transmission demands of terminal identification information using a great radio wave strength enabling communication to the first range and a weak radio wave strength enabling communication to the second range. When the terminal identification information can be received after making a transmission demand for the terminal identification information using a great radio wave strength while the terminal identification information cannot be received after making a transmission demand for the terminal identification information using a weak radio wave strength, then the radio communication portion 108 judges that the mobile communication terminal 250 is within the first range. When the terminal identification information can be received after making transmission demands of the terminal identification information using both great and weak radio wave strengths, then the radio communication portion 108 judges that the mobile communication terminal 250 is within the second range. When the terminal identification information cannot be received after making transmission demands for the terminal identification information using both great and weak radio wave strengths, then the radio communication portion 108 judges that the mobile communication terminal 250 is neither within the first range nor the second range.

It is also possible that the mobile communication terminal 250 has two data communication portions providing different communicable distances, and the two data communication portions are provided with different terminal identification information, in order to detect if the mobile communication terminal 250 is within the first range or the second range, which is based on the MFP 100. For example, the communicable distance of the data communication portion providing the longer communicable distance is set to be the first distance, and the communicable distance of the data communication portion providing the shorter communicable distance is set to be the second distance. When the terminal identification information provided for the data communication portion providing the longer communicable distance can be received while the terminal identification information provided for the data communication portion providing the shorter communicable distance cannot be received, then the radio communication portion 108 judges that the mobile communication terminal 250 is within the first range. When both terminal identification information provided for the data communication portion providing the longer communicable distance and terminal identification information provided for the data communication portion providing the shorter communicable distance can be received, then the radio communication portion 108 judges that the mobile communication terminal 250 is within the second range. When neither terminal identification information provided for the data communication portion providing the longer communicable distance nor terminal identification information provided for the data communication portion providing the shorter communicable distance can be received, then the radio communication portion 108 judges that the mobile communication terminal 250 is not within the first range and the second range.

The operation mode switching portion 157 is controlled by the print-job control portion 151 and switches the operation mode of the MFP 100. The operation mode switching portion 157 outputs the switched operation mode of the MFP 100 to the print-job control portion 151.

The image-forming control portion 159 controls the image-forming portion 30. The image-forming control portion 159 converts print data into raster data according to image-forming conditions, and outputs the raster data to the image-forming portion 30. Upon input of the raster data, the image-forming portion 30 starts image formation. Also, the image-forming control portion 159 controls the temperature of the pair of fixing rollers 36 of the image-forming portion 30.

Upon input of a print job from the print-job receiving portion 153, and when the job information included in the print job includes user identification information, then the print-job control portion 151 stores the print job 187 in the HDD 106, generates job control data 185 to control the print job 187, and stores the generated job control data 185 in the HDD 106. The print job stored in the HDD 106 will be hereinafter referred to as a stand-by job.

FIG. 9 is a diagram showing an example of the format of the job control data. Referring to FIG. 9, the job control data 185 includes user identification information and print-job identification information for identifying the print job. Thus, a look at the job control data enables it to identify the print job using the user identification information.

Referring back to FIG. 6, the print-job control portion 151 includes a print-job searching portion 161 and a print-job acquiring portion 163. Upon input of the terminal identification information of the mobile communication terminal 250 from the communication control portion 155, the print-job searching portion 161 searches the user data 183 stored in the HDD 106 and extracts user identification information associated with the terminal identification information. Upon extraction of the user identification information, the print-job searching portion 161 searches the job control data 185 stored in the HDD 106 and extracts print-job identification information associated with the user identification information. Also, upon extraction of the user identification information, the print-job searching portion 161 controls the communication I/F portion 102 and transmits a print-job search demand to the other MFPs 100A, 100B, and 100C. The print-job search demand at least includes the user identification information. Receiving the print-job search demand, the other MFPs 100A, 100B, and 100C search the job control data 185 stored in each HDD 106. When print-job identification information associated with the user identification information included in the print-job search demand is extracted from an MFP among the other MFPs 100A, 100B, and 100C, the MFP among the other MFPs 100A, 100B, and 100C transmits a signal indicating that the print job exists. Then, the print-job searching portion 161 controls the communication I/F portion 102 and receives, from the MFP among the other MFPs 100A, 100B, and 100C that stores the print job associated with the user identification information, the signal indicating that the print job exists. While the print-job searching portion 161 transmits a print-job search demand to all the other MFPs 100A, 100B, and 100C included in one group, it is possible that the print-job searching portion 161 transmits a print-job search demand only to the home terminal of the user in the user identification information.

When the print-job searching portion 161 extracts print-job identification information by searching the job control data 185, or receives, from any of the other MFPs 100A, 100B, and 100C, a signal indicating that a print job exists, then the print-job acquiring portion 163 acquires a print job specified by the print-job identification information included in the signal indicating that the print job exists. Specifically, the print-job acquiring portion 163 reads out, from the HDD 106, the print job 187 specified by the print-job identification information extracted by a search of the job control data 185. When the print-job searching portion 161 receives, from any of the other MFPs 100A, 100B, and 100C, a signal indicating that the print job exists, then the print-job acquiring portion 163 transmits a print-job transmission demand to the MFP, among the other MFPs 100A, 100B, and 100C, that has transmitted the signal indicating that the print job exists. The print-job transmission demand at least includes the print-job identification information. The MFP, among the other MFPs 100A, 100B, and 100C, that has received the print-job transmission demand reads out, from the HDD 106, a print job specified by the print-job identification information included in the print-job transmission demand, and transmits the print job to the MFP 100. Then, the print-job acquiring portion 163 controls the communication I/F portion 102 and receives the print job from the MFP, among the other MFPs 100A, 100B, and 100C, that stores the print job associated with the user identification.

Upon input of the terminal identification information of the mobile communication terminal 250 and a first signal from the communication control portion 155, the print-job control portion 151 causes the print-job searching portion 161 to search a print job. When the print-job searching portion 161 detects a print job corresponding to the terminal identification information of the mobile communication terminal 250, the print-job control portion 151 causes, for example, the operation mode switching portion 157, the print-job acquiring portion 163, the image-forming control portion 159 to start a preparation operation to cause the image-forming portion 30 to form the print job into an image. In other words, the print-job control portion 151 starts the preparation operation when print-job control portion 151 detects that the mobile communication terminal 250 is within the first range, which is based on the MFP 100, and when the print job that has been instructed to be printed by the user carrying the mobile communication terminal 250 exists as a stand-by job. The preparation operation for image formation includes the following:

(1) Cause the operation mode switching portion 157 to switch the operation mode to the stand-by mode.
(2) Cause the print-job acquiring portion 163 to acquire the print job.
(3) Cause the image-forming control portion 159 to convert the print data into raster data.

Also, upon input of the terminal identification information of the mobile communication terminal 250 and a second signal from the communication control portion 155, the print-job control portion 151 causes the image-forming control portion 159 to execute the print job. In other words, the print-job control portion 151 forms the print job into an image when print-job control portion 151 detects that the mobile communication terminal 250 is within the second range, which is based on the MFP 100, and when the print job that has been instructed to be printed by the user carrying the mobile communication terminal 250 exists as a stand-by job.

Next, generation of user data will be described. Assume that the other MFPs 100A, 100B, and 100C are already connected to the network 2 and the MFP 100 is intended to be newly connected to the network 2. It is required to set, in the MFP 100, apparatus identification information for identifying the MFP 100 and the above-described registered user information. When apparatus identification information and registered user information are set in the MFP 100, the MFP 100 transmits the apparatus identification information and the registered user information to the other MFPs 100A, 100B, and 100C. The image-forming system 1 composed of the MFPs 100, 100A, 100B, and 100C is thus formed.

FIG. 10A is a flow chart showing an example of the flow of an initial setting processing. The initial setting processing is executed in the MFP 100 when the MFP 100 is newly connected to the network 2. FIG. 10B is a flow chart showing an example of the flow of a connection processing. The connection processing is executed in each of the other MFPs 100A, 100B, and 100C, which are already connected to the network 2, when the MFP 100 is newly connected to the network 2. The initial setting processing and the connection processing are executed by the CPU 101 of each of the MFPs 100, 100A, 100B, and 100C by loading in the RAM 104 the print-job control program stored in the ROM 103.

Referring to FIG. 10A, in the MFP 100, apparatus identification information is registered (step S01). According to a terminal registration screen on the display portion 80A, a user inputs the apparatus identification information into the operating portion 80B. The apparatus identification information is then accepted by the MFP 100 and stored in the HDD 106. The apparatus identification information is identification information for identifying the MFP 100, and is preferably positional information of the MFP 100 in the network 2 assigned to the MFP 100. The apparatus identification information here is an IP (Internet Protocol) address. It is also possible to register, with the apparatus identification information, information indicating the place where the MFP 100 is located.

Next, in the MFP 100, the registered user information of the user who uses the MFP 100 as the home terminal is registered (step S02). According to a registered-user-information screen on the display portion 80A, a user inputs the registered user information into the operating portion 80B. The registered user information is then accepted by the MFP 100 and stored in the HDD 106. When a plurality of users use the MFP 100 as the home terminal, the registered user information of each user is accepted and stored. The registered user information at least includes user identification information for identifying the user and terminal identification information assigned to the mobile communication terminal 250 carried by the user. Generally, different persons control the MFP 100 for the registration of apparatus identification information in step S01 and for the registration of registered user information in step S02.

Then, the MFP 100 judges whether the initial setting is completed (step S03). When the initial setting is completed, the processing proceeds to step S04, and when the initial setting is not completed, the processing goes back to step S01. When the user accepts an instruction of a completion button displayed on the display portion 80A, the CPU 101 detects the completion of the initial setting. At the time of proceeding to step S04, the registered user information 181 shown in FIG. 7A is stored in the HDD 106 of the MFP 100.

In step S04, the MFP 100 transmits the apparatus identification information and the registered user information that have been subjected to initial setting to the MFPs of the same group. The term same group refers to a collection of the MFPs constituting the image-forming system 1. Here the MFPs 100, 100A, 100B, and 100C, which are connected to the network 2, are the same group. Thus, the MFP 100 transmits an inquiry to the network 2 by broadcast, and receives an IP address transmitted, in response to the inquiry, by each of the other MFPs 100A, 100B, and 100C, which are the same group. In this manner the MFP 100 receives the IP addresses of the other MFPs constituting the same group. Also, grouping enables it to classify a plurality of MFPs connected to the network 2 into different groups. For example, the MFPs 100 and 100A constitute one group and the MFPs 100B and 100C constitute another group. It is the user who sets the grouping. Specifically, as described above, the MFP 100 receives the IP addresses of the other MFPs 100A, 100B, and 100C, which are connected to the network 2, and thus detects the other MFPs 100A, 100B, and 100C. Then, the user designates an MFP among the other MFPs 100A, 100B, and 100C to be the same group as the MFP 100. In this manner apparatuses to be the same group are specified.

The MFP 100 transmits the apparatus identification information and the registered user information to one MFP selected from the other MFPs 100A, 100B, and 100C, which are the same group as the MFP 100. The following description is about the case where the MFP 100A is selected and the apparatus identification information and the registered user information of the MFP 100 are transmitted from the MFP 100 to the MFP 100A.

Referring to FIG. 10B, the MFP 100A receives the apparatus identification information and the registered user information of the MFP 100 transmitted from the MFP 100 (step S11). In response to this reception, the MFP 100A transmits, to the MFP 100, the registered user information stored in the HDD 106 of the MFP 100A and the apparatus identification information assigned to the MFP 100A (step S12). That is, the connection processing is executed on condition that a demand from the MFP 100 that is subjected to the initial setting processing is received. In the next step S13, user data is generated from the apparatus identification information and the registered user information of the MFP 100, which are received in step S11. The generated user data is added to the user data already stored in the HDD 106.

Referring back to FIG. 10A, the MFP 100 receives the apparatus identification information and the registered user information of the MFP 100A transmitted from the MFP 100A (step S05). Then, the MFP 100 judges if there is an MFP in the same group that the MFP 100 has not transmitted its apparatus identification information and registered user information to (step S06). When such an MFP exists, the MFP is selected and the processing goes back to step S04. When such an MFP does not exist, the processing proceeds to step S07. Since the MFP 100 has not transmitted its apparatus identification information and registered user information to the MFPs 100B and 100C, either MFP 100B or MFP 100C is selected and the processing goes back to step S04. In this manner the MFP 100 transmits its apparatus identification information and registered user information to the MFP of the same group in a one-by-one manner (step S04), and receives from each MFP its apparatus identification information and registered user information (step S05). While the MFP 100 selects an MFP of the same group in a one-by-one manner and transmits the apparatus identification information and the registered user information of the MFP 100 to the selected MFP, it is also possible that the MFP 100 transmits by broadcast its apparatus identification information and registered user information and receives the apparatus identification information and the registered user information stored in each of the other MFPs 100A, 100B, and 100C from each of the other MFPs 100A, 100B, and 100C.

In step S07, the MFP 100 judges whether the registered user information of the own device is used for generating user data. The judgment can be based on the user's selection or can be predetermined. When it is judged that the registered user information of the MFP 100 is used, the processing proceeds to step S08. When it is judged that the registered user information of the MFP 100 is not used, the processing skips step S08 and proceeds to step S09. In step S08, the registered user information stored in the MFP 100 is read out. In step S09, use data is generated from the apparatus identification information and the registered user information, and generated user data is stored in the HDD 106.

When step S08 is skipped, a set of user data are generated from the apparatus identification information and the registered user information received from the other MFPs 100A, 100B, and 100C. Thus, the MFP 100 stores a set of user data each associating the apparatus identification information of each of the other MFPs 100A, 100B, and 100C with the registered user information stored in each of the other MFPs 100A, 100B, and 100C. FIG. 11 is a second diagram showing an example of user data stored in the MFP 100. Similarly to the set of user data stored in the MFP 100, the MFP 100A stores a set of user data each associating the apparatus identification information of each of the MFPs 100, 100B, and 100C with the registered user information stored in each of the MFPs 100, 100B, and 100C; the MFP 100B stores a set of user data each associating the apparatus identification information of each of the MFPs 100, 100A, and 100C with the registered user information stored in each of the MFPs 100, 100A, and 100C; and the MFP 100C stores a set of user data each associating the apparatus identification information of each of the MFPs 100, 100A, and 100B with the registered user information stored in each of the MFPs 100, 100A, and 100B.

When step S08 is executed, user data is generated by the registered user information received from the other MFPs 100A, 100B, and 100C, the registered user information stored in the MFP 100, and the apparatus identification information of the MFPs 100, 100A, 100B, and 100C. Thus, the user data 183 shown in FIG. 8 is stored in the HDD 106 of each of the MFPs 100, 100A, 100B, and 100C.

While in this embodiment the user data includes apparatus identification information and registered user information, the user data may at least include registered user information. While the registration processing of the apparatus identification information and the registration processing of the registered user information are executed in the initial setting processing executed in the MFP 100, the same are executed when the MFP 100 is already connected to the network 2 and a user is added. In this case, however, the registration processing of the apparatus identification information in step S01 is not necessary.

The execution of the initial setting processing is not limited to the case where one of the MFPs 100, 100A, 100B, and 100C is connected to the network 2. The initial setting processing can be executed after power is input into one of the MFPs 100, 100A, 100B, and 100C, or at predetermined time intervals. As one reason, for example, when a new user is registered in the MFP 100, the registered user information of the new user is transmitted to the other MFPs 100A, 100B, and 100C, so that the latest user data can be stored in the other MFPs 100A, 100B, and 100C. In this case, the MFP 100 does not execute step S01 and step S03 of the initial setting processing shown in FIG. 10A, but executes step S02, which is the inputting processing of the registered user information. Conversely, as another reason, the MFP 100 acquires the registered user information of a user newly registered in one of the other MFPs 100A, 100B, and 100C, so that the MFP 100 can store the latest user data. In this case, the MFP 100 does not execute steps S01-S03 of the initial setting processing shown in FIG. 10A, but demands the one of the other MFPs 100A, 100B, and 100C to transmit each registered user information. The transmission demand for registered user information at least includes the apparatus identification information. In response to the transmission demand, the other MFPs 100A, 100B, and 100C execute the connection processing shown in FIG. 10B. In step S11, in response to the received transmission demand, the other MFPs 100A, 100B, and 100C transmit the registered user information stored in each HDD 106 to the MFP 100, which has transmitted the transmission demand. Thus, in the case of a change in the registered user information stored in the other MFPs 100A, 100B, and 100C, user data is generated from the changed registered user information and stored in the HDD 106 of the MFP 100. In this case, the other MFPs 100A, 100B, and 100C do not have to execute step S13 of the connection processing.

FIG. 12 is a flow chart showing an example of the flow of a print processing. The print processing is executed by the CPU 101 of the MFP 100 by executing a print-job control program. Referring to FIG. 12, the CPU 101 judges if the CPU 101 has received a print job (step S21). When the print job is received, the processing proceeds to step S22. When the print job is not received, processing proceeds to step S24. In step S22, the received print job is stored in the HDD 106. Then, job control data is generated from print-job identification information and user identification information included in the job information of the print job, and the job control data 185 is stored in the HDD 106 (step S23).

In the next step S24, a transmission demand for terminal identification information is transmitted. Then, whether the terminal identification information is received from the mobile communication terminal 250 is judged (step S25). When the terminal identification information is received, the processing proceeds to step S26. When the terminal identification information is not received, the processing goes back to step S21. This is because when the terminal identification information is not received after a transmission demand for the terminal identification information is transmitted, the mobile communication terminal 250 is not within the range communicable from the MFP 100. In step S26, a print job associated with the received terminal identification information is searched. The search for a print job will be described later.

When a print job associated with the received terminal identification information is found to exist as a result of print-job searching ("YES" in step S27), the processing proceeds to step S28. When a print job does not exist, the processing goes back to step S21. That is, when communication with the mobile communication terminal 250 is possible and the print job to which a print instruction has been made by the user who carries that mobile communication terminal 250 exists, then the processing proceeds to step S28. When, on the other hand, such a print job does not exist, the steps after step S28 are not executed. This is for the purpose of preventing unnecessary power consumption by not executing the steps after step S28 when a print job for image formation does not exist.

In step S28, the distance between the MFP 100 and the mobile communication terminal 250 is measured based on the strength of a radio wave received from the mobile communication terminal 250. While the distance is measured based on radio wave strength, infrared rays or the like can be used to measure the distance. In the next step S29, whether the measured distance is below the first distance and whether the measured distance is above or below the second distance are judged. In other words, whether the mobile communication terminal 250 is within the first range, which is predetermined based on the MFP 100, is judged. When the measured distance is below the first distance and above the second distance, the processing proceeds to step S30. Otherwise, the processing proceeds to step S31. In step S30, an image-forming preparation processing is executed to start a preparation operation to cause the image-forming portion 30 to form into an image the print job that has been confirmed to exist in step S27. The image-forming preparation processing will be described in detail later.

In step S31, whether the distance measured in step S28 is below the second distance is judged. In other words, whether the mobile communication terminal 250 is within the second range, which is predetermined based on the MFP 100, is judged. When the measured distance is below the second distance, the processing proceeds to step S32. Otherwise, the processing goes back to step S21. In step S32, the print job that has been confirmed to exist in step S27 is formed into an image by the image forming portion 30. At the time of approach to the MFP 100 within the first distance by the user who carries the mobile communication terminal 250, an image is not formed but an image-forming preparation processing is executed. This prevents erroneous image-formation when the user does not intend to move to the MFP 100. For example, if an image was formed at the time of the user's approach to the MFP 100 within the first distance, then a sheet of paper having the formed image on would be output without the user's notice and others could take a look at it. An image is not formed, however, when the user approaches the MFP 100 within the first distance and others cannot take a look at the contents of the print data. When the user further approaches the MFP 100 and the distance between the user and the MFP 100 reduces below the second distance, image formation starts. Since a preparation operation to form an image starts at the time of the user's approach to the MFP 100 within the first distance, an image is immediately formed upon approach to the MFP 100 within the second distance by the user. By the time the user reaches the MFP 100, the print job is already completed or half completed. Thus, the waiting time after the user has reached the MFP 100 is shortened.

When image formation in step S32 is completed, job control data 185 is deleted from the HDD 106 (step S33), and the processing goes back to step S21. When a print job is received from any of the other MFPs 100A, 100B, and 100C, an instruction to delete the job control data 185 is transmitted to the MFP that has transmitted the print job. Deleting the job control data 185 prevents the repeated execution of the same print data, since there is no job control data 185 now when the user who carries the mobile communication terminal 250 next approaches.

FIG. 13 is a flow chart showing an example of the flow of a print job search processing. The print job search processing is executed in step S26 shown in FIG. 12. Referring to FIG. 13, the CPU 101 judges whether a print job is stored in the HDD 106 of the own apparatus of the CPU 101, which is the MFP 100 here (step S41). When the HDD 106 stores job control data 185 including user identification information associated with terminal identification information received in step S25 shown in FIG. 25 and with user data 183, then the CPU 101 judges that its own apparatus stores the print job and the processing proceeds to step S44. Otherwise, the proceeding proceeds to step S42. In step S44, "print job exists" is set as the returned value, and the processing goes back to the print processing.

In step S42, an inquiry about the presence of a print job is made to the other MFPs 100A, 100B, and 100C. Specifically, the CPU 101 transmits a print-job search demand to the other MFPs 100A, 100B, and 100C and receives the search results. The print-job search demand at least includes the user identification information. Receiving the print-job search demand, the other MFPs 100A, 100B, and 100C search the job control data 185 stored in each HDD 106 of the own device. When job control data 185 including print-job identification information associated with the user identification information included in the print-job search demand is extracted from an MFP among the other MFPs 100A, 100B, and 100C, then the MFP among the other MFPs 100A, 100B, and 100C transmits a signal indicating that the print job exists to the MFP 100. The signal indicating that the print job exists includes print-job identification information associated with the user identification information included in the print-job search demand. When the CPU 101 of the MFP 100 receives the signal indicating that the print job exists from the MFP among the other MFPs 100A, 100B, and 100C ("YES" in step S43), the processing proceeds to step S44. When no such signal is received, the processing proceeds to step S45. In step S45, "no print job" is set as the returned value, and the processing goes back to the print processing.

Figure 14:
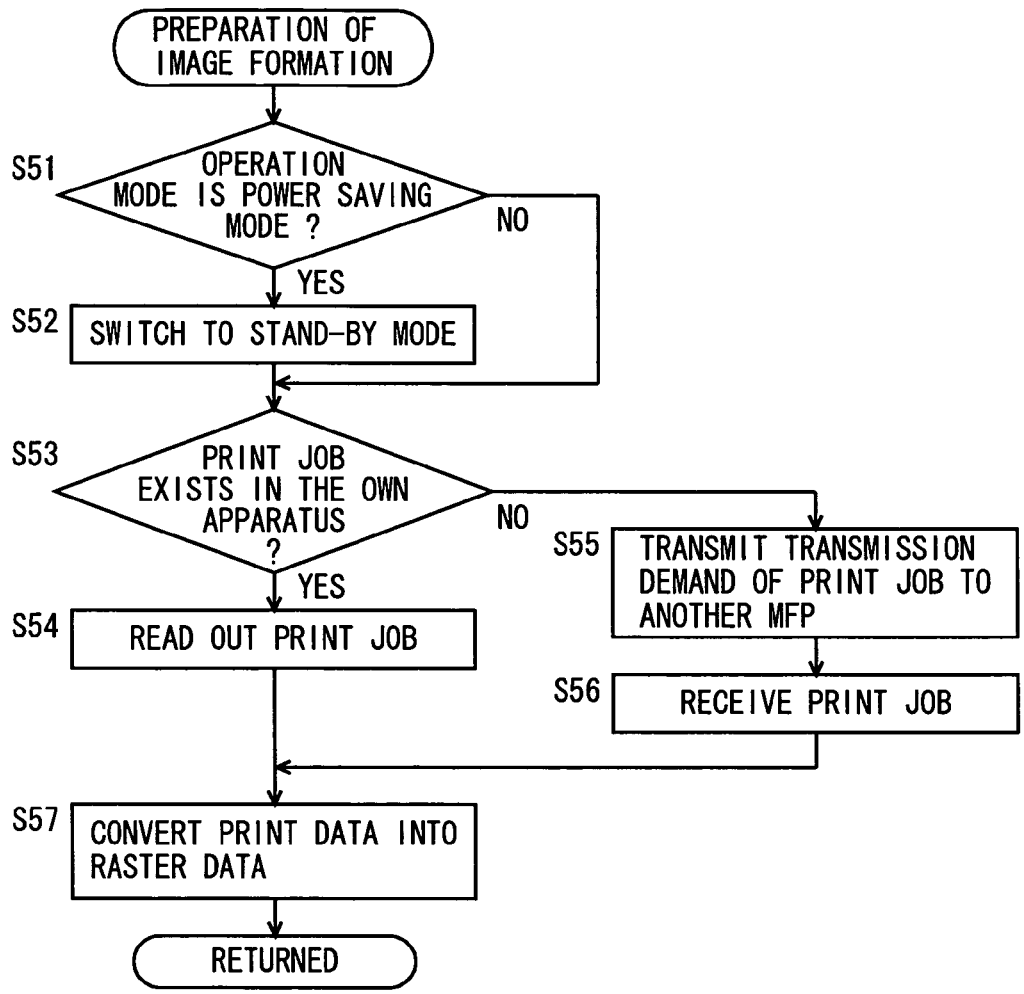
FIG. 14 is a flow chart showing an example of the flow of an image-forming preparation processing.

FIG. 14 is a flow chart showing an example of the flow of an image-forming preparation processing. The image-forming preparation processing is executed in step S30 shown in FIG. 12. Referring to FIG. 14, the CPU 101 judges whether the operation mode of the MFP 100 is an energy-saving mode (step S51). The energy-saving mode refers to the sleep mode or the low power mode. When the operation mode is the energy-saving mode, the processing proceeds to step S52. When the operation mode is the stand-by mode ("NO" in step S51), the processing skips step S52 and proceeds to step S53. In step S52, the operation mode is switched to the stand-by mode. As described above, in the energy-saving mode, the temperature of the pair of fixing rollers 36 is not maintained to be a predetermined temperature optimum for melting the toner, that is, the temperature of the pair of fixing rollers 36 is lower than the predetermined temperature. When the energy-saving mode is switched to the stand-by mode, it takes some time before the operation mode substantially becomes the stand-by mode, in other words, before the temperature of the pair of fixing rollers 36 rises to the predetermined temperature. In view of this, when a user carrying the mobile communication terminal 250 approaches the MFP 100 within the first distance, an image-forming preparation operation is executed, so that the MFP 100 is in the substantial stand-by mode at the time of the user's approach within the second distance.

In step S53, the CPU 101 judges whether the print job that has been confirmed to exist by the print-job search processing executed in step S26 shown in FIG. 12 is stored in the HDD 106 of the own apparatus of the CPU 101, which is the MFP 100 here. When the print job is stored in the HDD 106, the processing proceeds to step S54. When the print job is stored in the other MFPs 100A, 100B, and 100C ("NO" in step S53), the processing proceeds to step S55. In step S54, the print job is read out from the HDD 106 and the processing proceeds to step S57.

In step S55, for the print job that has been confirmed to exist by the print-job search processing executed in step S26 shown in FIG. 12, a print-job transmission demand is transmitted to the MFP among the other MFPs 100A, 100B, and 100C that has transmitted the signal indicating that the print job exists. The print-job transmission demand includes the print-job identification information for identifying the print job. The MFP among the other MFPs 100A, 100B, and 100C that has received the transmission demand reads out of its HDD 106 the print job specified by the print-job identification information included in the transmission demand, and transmits the print job to the MFP 100 in response. The CPU 101 of the MFP 100 receives the print job (step S56). The processing then proceeds to step S57.

Since the acquisition of the print job starts upon approach to the MFP 100 within the first distance by the user who carries the mobile communication terminal 250, the acquisition of the print job is completed by the time the user approaches the MFP 100 within the second distance. Thus, as compared with starting the acquisition of the print job when the user reaches the MFP 100, the waiting time is shortened by the time spent for the acquisition of the print job.

For example, when the user inputs into the PC 200 a print instruction designating the MFP 100A, the print job is stored in the HDD 106 of the MFP 100. When, however, the user moves toward the MFP 100 thereafter while carrying the mobile communication terminal 250, the print job is executed in the MFP 100 based on the print instruction designating the MFP 100A. The user therefore may input into the PC 200 a print instruction designating any one of the MFPs 100, 100A, 100B, and 100C. In other words, the user need not designate one of the MFPs 100, 100A, 100B, and 100C when inputting a print instruction. The user only needs to move toward the desired MFP among the MFPs 100, 100A, 100B, and 100C thereby causing the desired MFP to form an image. Further, the user can reach a sheet of paper having the formed image on without having it seen by anyone.

In step S57, print data included in the print job acquired in step S53 is converted into raster data according to image-forming conditions, and the processing goes back to the print processing. By converting the print data before data input of the image-forming portion 30, the image-forming portion 30 can immediately form an image. Compared with converting the print data into raster data when the user reaches the MFP 100, the waiting time is shortened by the time spent for conversion of the print data into raster data.

FIRST MODIFIED EXAMPLE

Figure 15:
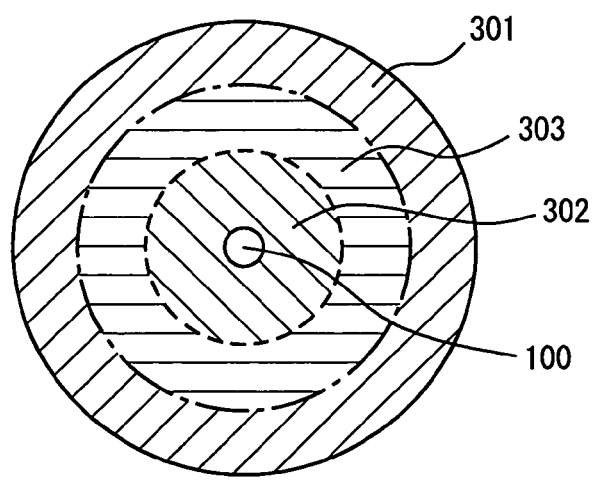
FIG. 15 is a diagram illustrating a first range, a second range, and a third range that are based on the MFP.

In the above embodiment, the MFP 100 starts a preparation operation to form an image upon approach to the MFP 100 within the first distance by a user who carries the mobile communication terminal 250, and starts image formation upon reduction of the distance below the second distance. In a first modified example, the image-forming operation is executed in a stepwise manner according to the distance between the MFP 100 and the user. FIG. 15 is a diagram illustrating a first range, a second range, and a third range that are based on the MFP 100. Referring to FIG. 15, a first range 301 is between the MFP 100 and the first range, and above a third distance. The third distance is shorter than the first distance and longer than a second distance. A third range 303 is between the MFP 100 and the third distance, and above the second distance. A second range 302 is between the MFP 100 and the second distance.

The MFP 100 in the modified example starts a first preparation operation to form an image upon approach to the MFP 100 within the first distance by the user who carries the mobile communication terminal 250; starts a second preparation operation to form an image upon approach to the MFP 100 within the third distance by the user; and starts image formation upon approach to the MFP 100 within the second distance by the user. The execution of the preparation operation in a stepwise manner reduces power consumption. For example, when the user within the first range does not enter the second range and goes out of the first range, the second preparation operation does not start, thus reducing power consumption. Also, since the first distance can be set to be longer, it is possible to start the first preparation operation at as early a stage as possible.

Figure 16:
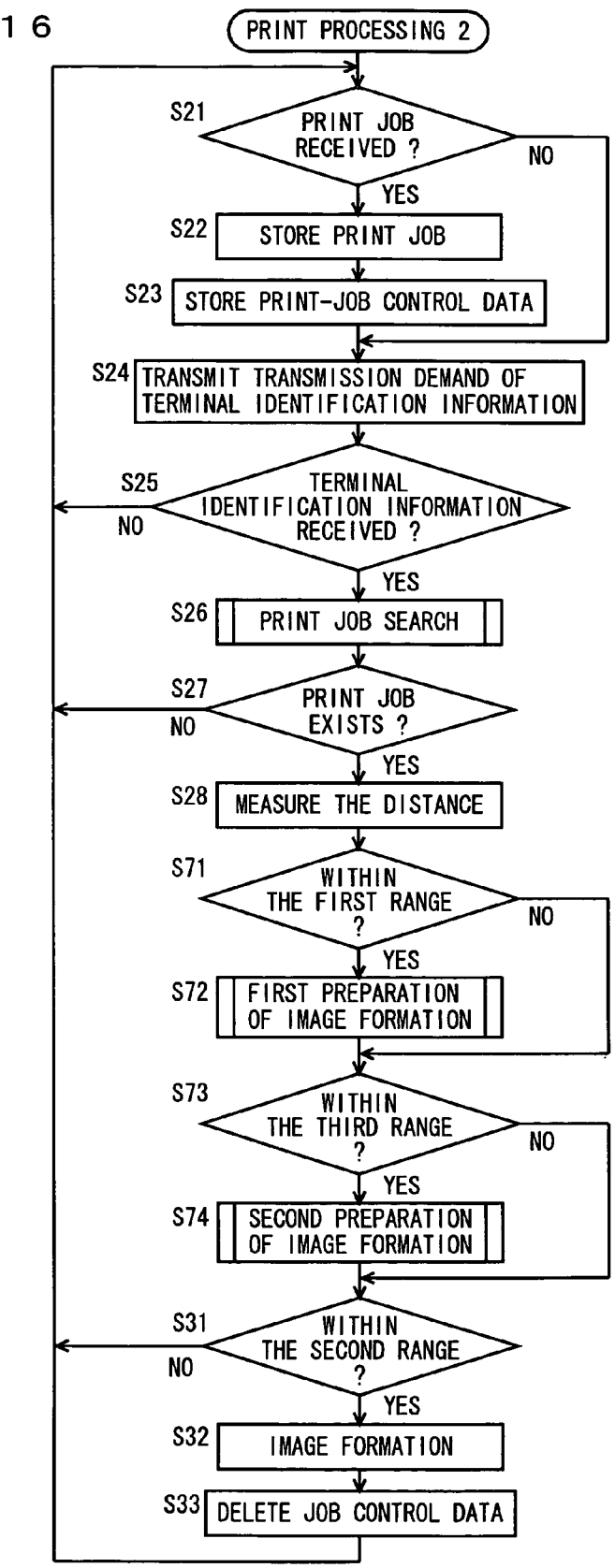
FIG. 16 is a flow chart showing an example of the flow of a print processing in a first modified example.

FIG. 16 is a flow chart showing an example of the flow of a print processing in the first modified example. Referring to FIG. 16, as opposed to the printing processing shown in FIG. 12, steps S71 to S74 are added in place of steps S29 and S30. The other steps are the same as in FIG. 12 and therefore description thereof will not be repeated. In step S71, whether the mobile communication terminal 250 is within the first range, which is predetermined based on the MFP 100, is judged from the distance measured in the previous step S28.

When the distance measured in step S28 is below the first distance and above the third distance, the mobile communication terminal 250 is judged to be within the first range. When the mobile communication terminal 250 is within the first range, the processing proceeds to step S72. Otherwise, the processing proceeds to step S73. In step S72, a first image-forming preparation processing is executed to start a first preparation operation to cause the image-forming portion 30 to form an image. The first image-forming preparation processing will be described in detail later.

In step S73, whether the mobile communication terminal 250 is within the third range, which is predetermined based on the MFP 100, is judged from the distance measured in the previous step S28. When the distance measured in step S28 is below the third distance and above the second distance, the mobile communication terminal 250 is judged to be within the third range. When the mobile communication terminal 250 is within the third range, the processing proceeds to step S74. Otherwise, the processing proceeds to step S31. In step S74, a second image-forming preparation processing is executed to start a second preparation operation to cause the image-forming portion 30 to form an image. The second image-forming preparation processing will be described in detail later.

Figure 17:
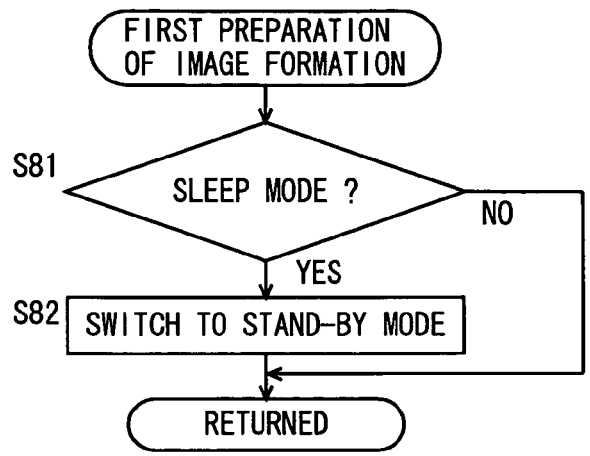
FIG. 17 is a flow chart showing an example of the flow of a first image-forming preparation operation processing.

FIG. 17 is a flow chart showing an example of the flow of the first image-forming preparation processing. Referring to FIG. 17, the CPU 101 judges whether the operation mode of the MFP 100 is the sleep mode (step S81). When the operation mode is the sleep mode, the processing proceeds to step S82. When the operation mode is not the sleep mode, the processing skips step S82 and goes back to the print processing. As described above, in the sleep mode, the temperature of the pair of fixing rollers 36 is not controlled and thus the lowest of all the operation modes. Thus, switching from the sleep mode to the substantial stand-by mode takes the longest time. The first image-forming preparation operation is executed when the user carrying the mobile communication terminal 250 is within the first range 301, which is the furthest from the MFP 100, and thus the MFP 100 is turned into the substantial stand-by mode upon approach to the MFP 100 within the second distance by the user.

Figure 18:
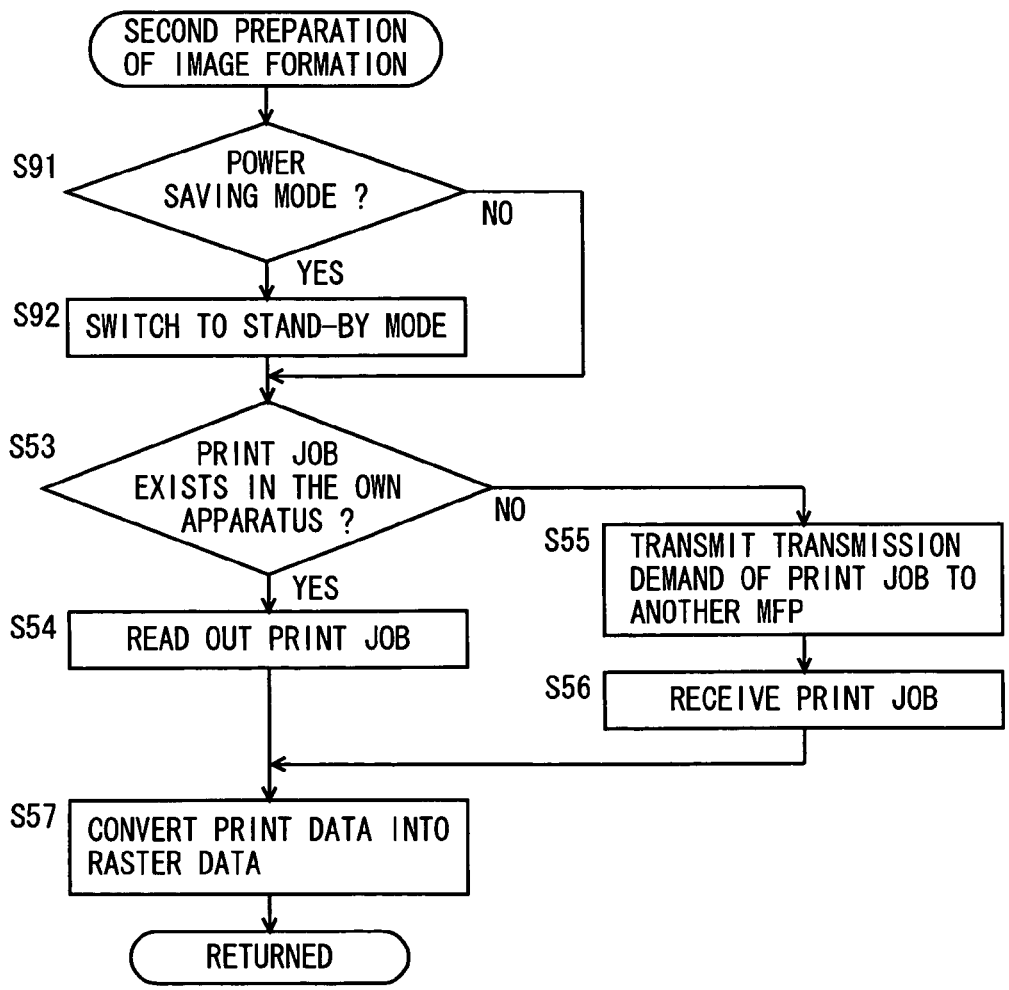
FIG. 18 is a flow chart showing an example of the flow of a second image-forming preparation operation processing.

FIG. 18 is a flow chart showing an example of the flow of the second image-forming preparation operation processing. Referring to FIG. 18, as opposed to the image-forming preparation operation processing shown in FIG. 14, steps S91 and S92 are added in place of steps S51 and S52. The other steps are the same as in FIG. 14 and therefore description thereof will not be repeated. The CPU 101 judges whether the operation mode of the MFP 100 is the low power mode (step S91). When the operation mode is the low power mode, the processing proceeds to step S92. When the operation mode is not the low power mode, the processing skips step S92 and proceeds to step S53. As described above, although in the low power mode the temperature of the pair of fixing rollers 36 is controlled, the temperature is higher than when in the sleep mode and lower than when in the stand-by mode. Thus, the time required for switching the low power mode to the stand-by mode, although shorter than the case of the sleep mode, still takes some time. The second image-forming preparation operation is executed when the user carrying the mobile communication terminal 250 is within the third range 303, which is the second furthest from the MFP 100, and thus the MFP 100 is turned into the substantial stand-by mode upon approach to the MFP 100 within the second distance by the user. Also, when the user within the first range does not enter the third range and goes out of the first range, the second image-forming preparation operation is not executed, thus preventing unnecessary power consumption.

The image-forming preparation operation includes three major processings: (1) cause the operation mode switching portion 157 to switch the operation mode to the stand-by mode; (2) cause the print-job acquiring portion 163 to acquire the print job; and (3) cause the image-forming control portion 159 to convert the print data into raster data. These three processings can be executed in either the first image-forming preparation operation or the second image-forming preparation operation. Further, using an increased number of ranges that are predetermined based on the MFP 100, the three processings can be executed in a stepwise manner according to the distance between the MFP 100 and the user carrying the mobile communication terminal 250. The three processings are preferably executed in a time-consuming order; a processing that takes a longer time from start to completion being executed first.

SECOND MODIFIED EXAMPLE

Figure 19:
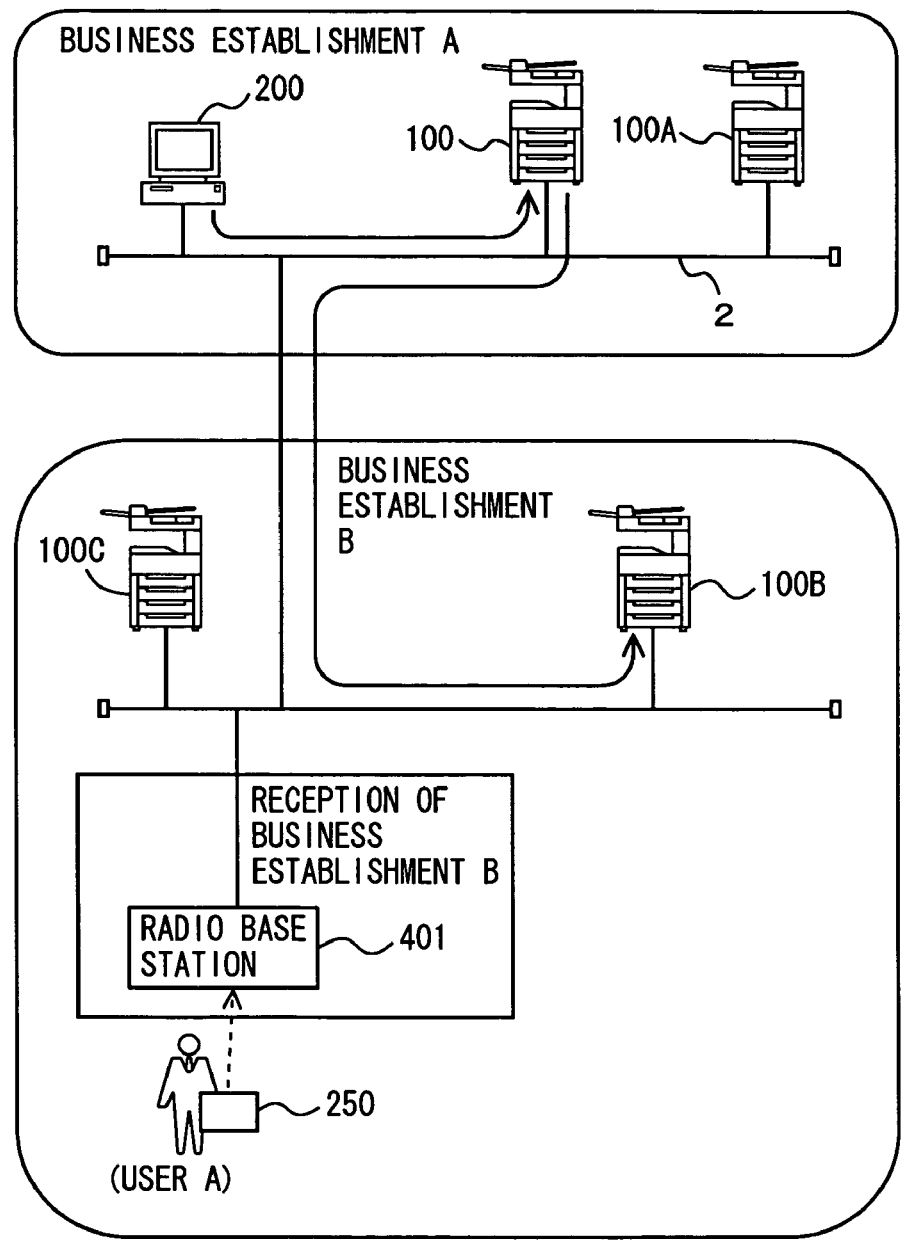
FIG. 19 is a schematic diagram of an image-forming system according to a second modified example.

FIG. 19 is a schematic diagram of an image-forming system 1A according to a second modified example. Referring to FIG. 19, a radio base station 401 is connected to the network 2 in addition to the PC 200 and the MFPs 100, 100A, 100B, and 100C. In the second modified example, the PC 200 and the MFPs 100 and 100A are provided in a first area, which is a business establishment A here, and the MFPs 100B and 100C and the radio base station 401 are provided in a second area, which is a business establishment B here. The radio base station 401 is located at a reception where a user passes when entering the site of the business establishment B. The radio base station 401 has similar functions to those of the radio communication portion 108 provided in the MFPs 100, 100A, 100B, and 100C, and in addition, has a communication interface through which to connect to the network 2. Here the radio base station 401 is set to be communicable with the MFPs 100B and 100C.

Assume that a user A inputs, using the PC 200, a print instruction designating the MFP 100. A print job is transmitted from the PC 200 to the MFP 100, and a print job 187 and job control data 185 are stored in the HDD 106 of the MFP 100. Then assume that the user A moves away from the business establishment A while carrying the mobile communication terminal 250 to the business establishment B. When, at the time the user A passes the reception, the radio base station 401 communicates with the mobile communication terminal 250 and receives terminal identification information, then the radio base station 401 transmits the received terminal identification information to the MFPs 100B and 100C.

Upon receipt of the terminal identification information from the radio base station 401, the MFPs 100B and 100C judge that the user A has entered the business establishment B and receive a print job from another MFP. For example, the MFP 100B transmits a print-job transmission demand to the other MFPs 100 and 100A, which are provided in the business establishment A. Receiving the print-job transmission demand, the other MFPs 100 and 100A transmit the print job to the MFP 100B when the print job is stored in each HDD 106.

The MFP 100B has executed the print processing shown in FIG. 12, and when the user A approaches the MFP 100B and enters the first range 301, the MFP 100B starts the image-forming preparation operation shown in FIG. 14. Here steps S53, S55, and S56 are not executed. This is because the print job is already received from the MFP 100 and stored in the HDD 106 of the MFP 100B. When the user A further approaches the MFP 100B and enters the second range 302, the MFP 100B starts image formation. It is also possible not to execute steps S29 and S30.

Thus, the radio base station 401 is further provided in order to detect, in addition to the distance from the MFP 100B, whether the user A has entered a certain area, which is the business establishment B here. Upon detection that the user A has entered the business establishment B, the MFP 100B starts a preparation operation to acquire the print job stored in the MFP 100. This eliminates the need for the user A to operate the MFP 100B to download the print job from the MFP 100.

While in the above embodiment description has been made of the MFPs 100, 100A, 100B, and 100C, it will be readily appreciated that the present invention can be taken as a print-job control method by which to cause the MFPs 100, 100A, 100B, and 100C to execute the steps shown in FIGS. 10A, 10B, 12 to 14, or FIGS. 10A, 10B, 16 to 18, or as a print-job control program embodied in a computer readable medium by which to cause the MFPs 100, 100A, 100B, and 100C to execute the steps shown in FIGS. 10A, 10B, 12 to 14, or FIGS. 10A, 10B, 16 to 18.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image-forming apparatus comprising:
   a distance measuring portion to communicate with a radio communication terminal and measure a distance between said image-forming apparatus and said radio communication terminal;
   a print data acquiring portion to acquire print data;
   a printer to print an image on a recording medium;
   a preparation operation starting portion to start a preparation operation to cause said printer to print an image, upon reduction of the measured distance equal to or below a first threshold value; and
   a print starting portion to cause said printer to print an image based on said acquired print data, upon reduction of the measured distance equal to or below a second threshold value smaller than said first threshold value; wherein
   said print data acquiring portion includes a print data detecting portion to detect print data corresponding to terminal identification information for identifying said radio communication terminal; and
   said preparation operation starting portion starts a preparation operation to cause said printer to print an image on condition that said print data detecting portion detects said print data.

2. The image-forming apparatus according to claim 1, wherein:
   said print data acquiring portion includes: a receiving portion to receive print data and terminal identification information for identifying said radio communication terminal, from a terminal connected to said receiving portion via a network; and a storage portion to store said received print data and said received terminal identification information; and
   said distance measuring portion measures a distance between said image-forming apparatus and a radio communication terminal storing the same terminal identification information as said terminal identification information stored in said storage portion.

3. The image-forming apparatus according to claim 1, wherein:
   said print data acquiring portion includes: a receiving portion to receive print data and print data identification information for identifying said print data, from a terminal connected to said receiving portion via a network; and a storage portion to store said received print data and said received print data identification information; and
   said distance measuring portion measures a distance between said image-forming apparatus and a radio communication terminal storing the same print data identification information as said print data identification information stored in said storage portion.

4. The image-forming apparatus according to claim 1, wherein when the printer is in a reduced power consumption state, the preparation operation starting portion starts an operation to turn the printer into a state of being able to immediately print an image.

5. The image-forming apparatus according to claim 1, wherein upon detection of said print data by said print data detecting portion, said preparation operation starting portion causes said print data acquiring portion to acquire said detected print data.

6. The image-forming apparatus according to claim 5, wherein said print data acquiring portion includes a downloading portion to download print data stored in a printer server or in another image-forming apparatus, said printer server and said another image-forming apparatus being connected to the downloading portion via a network.

7. The image-forming apparatus according to claim 1, wherein:
   said preparation operation starting portion includes: a data conversion portion to convert said acquired print data into raster data for inputting said acquired print data into said printer, upon reduction of the measured distance equal to or below said first threshold value; and a temporary storage portion to temporarily store said converted raster data;
   and
   said preparation operation starting portion inputs said raster data read out from said temporary storage portion into said printer, upon reduction of the measured distance equal to or below said second threshold value.

8. The image-forming apparatus according to claim 1, wherein:
   said preparation operation starting portion causes said printer to start a first preparation operation to an image, upon reduction of the measured distance equal to or below said first threshold value; and
   said preparation operation starting portion causes said printer to start a second preparation operation to print an image, upon reduction of the measured distance equal to or below a third threshold value smaller than said first threshold value and greater than said second threshold value.

9. The image-forming apparatus according to claim 1, wherein:
   said printer further includes an operation mode switching portion to switch an operation mode to one of a stand-by mode enabling immediate printing, a sleep mode providing lowest power consumption, and a low power mode providing power consumption higher than said sleep mode and lower than said stand-by mode;
   in said sleep mode, said preparation operation starting portion causes said operation mode switching portion to switch the operation mode to said stand-by mode, upon reduction of the measured distance equal to or below said first threshold value; and in said low power mode, said preparation operation starting portion causes said operation mode switching portion to switch the operation mode to said stand-by mode, upon reduction of the measured distance equal to or below a third threshold value smaller than said first threshold value and greater than said second threshold value.

10. An image-forming apparatus comprising:

a distance measuring portion to communicate with a radio communication terminal and measure a distance between said image-forming apparatus and said radio communication terminal;

a print data acquiring portion to acquire print data;

a printer to print an image on a recording medium;

a preparation operation starting portion to start a preparation operation to cause said printer to print an image, upon reduction of the measured distance equal to or below a first threshold value; and a print starting portion to cause said printer to print an image based on said acquired print data, upon reduction of the measured distance equal to or below a second threshold value smaller than said first threshold value; wherein said radio communication terminal stores print data identification information for identifying print data;

said print data acquiring portion includes a print data detecting portion to detect print data specified by said print data identification information stored in said radio communication terminal; and said preparation operation starting portion starts a preparation operation to cause said printer to print an image on condition that said print data detecting portion detects said print data.

11. The image-forming apparatus according to claim 10, wherein upon detection of said print data by said print data detecting portion, said preparation operation starting portion causes said print data acquiring portion to acquire said detected print data.

12. The image-forming apparatus according to claim 11, wherein said print data acquiring portion includes a downloading portion to download print data stored in a printer server or in another image-forming apparatus, said printer server and said another image-forming apparatus being connected to the downloading portion via a network.

13. The image-forming apparatus according to claim 10, wherein:

said print data acquiring portion includes: a receiving portion to receive print data and terminal identification information for identifying said radio communication terminal, from a terminal connected to said receiving portion via a network; and a storage portion to store said received print data and said received terminal identification information; and said distance measuring portion measures a distance between said image-forming apparatus and a radio communication terminal storing the same terminal identification information as said terminal identification information stored in said storage portion.

14. The image-forming apparatus according to claim 10, wherein:

said print data acquiring portion includes: a receiving portion to receive print data and print data identification information for identifying said print data, from a terminal connected to said receiving portion via a network; and a storage portion to store said received print data and said received print data identification information; and said distance measuring portion measures a distance between said image-forming apparatus and a radio communication terminal storing the same print data identification information as said print data identification information stored in said storage portion.

15. The image-forming apparatus according to claim 10, wherein when the printer is in a reduced power consumption state, the preparation operation starting portion starts an operation to turn the printer image-forming portion into a state of being able to immediately print form an image.

16. The image-forming apparatus according to claim 10, wherein:

said preparation operation starting portion includes: a data conversion portion to convert said acquired print data into raster data for inputting said acquired print data into said printer, upon reduction of the measured distance equal to or below said first threshold value; and a temporary storage portion to temporarily store said converted raster data; and said preparation operation starting portion inputs said raster data read out from said temporary storage portion into said printer, upon reduction of the measured distance equal to or below said second threshold value.

17. The image-forming apparatus according to claim 10, wherein:

said preparation operation starting portion causes said printer to start a first preparation operation to print an image, upon reduction of the measured distance equal to or below said first threshold value; and said preparation operation starting portion causes said printer to start a second preparation operation to print an image, upon reduction of the measured distance equal to or below a third threshold value smaller than said first threshold value and greater than said second threshold value.

18. The image-forming apparatus according to claim 10, wherein:

said printer further includes an operation mode switching portion to switch an operation mode to one of a stand-by mode enabling immediate printing, a sleep mode providing lowest power consumption, and a low power mode providing power consumption higher than said sleep mode and lower than said stand-by mode;

in said sleep mode, said preparation operation starting portion causes said operation mode switching portion to switch the operation mode to said stand-by mode, upon reduction of the measured distance equal to or below said first threshold value; and in said low power mode, said preparation operation starting portion causes said operation mode switching portion to switch the operation mode to said stand-by mode, upon reduction of the measured distance equal to or below a third threshold value smaller than said first threshold value and greater than said second threshold value.

19. A print job control method executed in an image-forming apparatus having a printer to print an image on a recording medium, the method comprising:

communicating with a radio communication terminal and measuring a distance between said image-forming apparatus and said radio communication terminal;

acquiring print data;

detecting print data corresponding to terminal identification information for identifying said radio communication terminal;

starting a preparation operation to cause said printer to print an image on condition that said print data is detected and upon reduction of the measured distance equal to or below a first threshold value; and causing said printer to print an image based on said acquired print data, upon reduction of the measured distance equal to or below a second threshold value smaller than said first threshold value.

20. A print-job control program embodied in a computer readable medium, said print-job control program being executed in an image-forming apparatus having a printer to print an image on a recording medium, said print-job control program causing said image-forming apparatus to execute steps comprising:

communicating with a radio communication terminal and measuring a distance between said image-forming apparatus and said radio communication terminal;

acquiring print data;

detecting print data corresponding to terminal identification information for identifying said radio communication terminal;

starting a preparation operation to cause said printer to print an image on condition that said print data is detected and upon reduction of the measured distance equal to or below a first threshold value; and causing said printer to print an image based on said acquired print data, upon reduction of the measured distance equal to or below a second threshold value smaller than said first threshold value.

21. A print-job control method executed in an image-forming apparatus having a printer to print an image on a recording medium, the method comprising:

communicating with a radio communication terminal and measuring a distance between said image-forming apparatus and said radio communication terminal, said radio communication terminal stores print data identification information for identifying print data;

acquiring print data;

detecting print data specified by said print data identification information stored in said radio communication terminal; and starting a preparation operation to cause said printer to print an image on condition that said print data is detected and upon reduction of the measured distance equal to or below a first threshold value; and causing said printer to print an image based on said acquired print data, upon reduction of the measured distance equal to or below a second threshold value smaller than said first threshold value.

22. A print-job control program embodied in a computer readable medium, said print-job control program being executed in an image-forming apparatus having a printer to print an image on a recording medium, said print-job control program causing said image-forming apparatus to execute steps comprising:

communicating with a radio communication terminal and measuring a distance between said image-forming apparatus and said radio communication terminal, said radio communication terminal stores print data identification information for identifying print data;

acquiring print data;

detecting print data specified by said print data identification information stored in said radio communication terminal; and starting a preparation operation to cause said printer to print an image on condition that said print data is detected and upon reduction of the measured distance equal to or below a first threshold value; and causing said printer to print an image based on said acquired print data, upon reduction of the measured distance equal to or below a second threshold value smaller than said first threshold value.

* * * * *